United States Patent
Ozawa

(10) Patent No.: US 10,116,415 B2
(45) Date of Patent: Oct. 30, 2018

(54) TRANSMISSION DEVICE, RECEIVING DEVICE, TRANSMISSION METHOD, AND RECEIVING METHOD

(71) Applicant: CANON KABUSHIKI KAISHA, Tokyo (JP)

(72) Inventor: Takeshi Ozawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 15/070,183

(22) Filed: Mar. 15, 2016

(65) Prior Publication Data

US 2016/0277548 A1 Sep. 22, 2016

(30) Foreign Application Priority Data

Mar. 20, 2015 (JP) .................. 2015-058539

(51) Int. Cl.
*H04L 12/50* (2006.01)
*H04L 1/00* (2006.01)
*H04L 1/18* (2006.01)
*H04L 29/06* (2006.01)
*H04N 21/2343* (2011.01)

(52) U.S. Cl.
CPC ............ *H04L 1/004* (2013.01); *H04L 1/1874* (2013.01); *H04L 65/608* (2013.01); *H04N 21/234327* (2013.01)

(58) Field of Classification Search
CPC .................................................. H04L 27/2602
USPC .......................................................... 370/392
See application file for complete search history.

(56) References Cited

U.S. PATENT DOCUMENTS

2010/0251060 A1* 9/2010 Doi .................. H03M 13/2906
714/752
2017/0195153 A1* 7/2017 Kwak ................. H04L 27/2602

FOREIGN PATENT DOCUMENTS

JP 2010-141413 A 6/2010

* cited by examiner

*Primary Examiner* — Dang Ton
(74) *Attorney, Agent, or Firm* — Carter, DeLuca, Farrell & Schmidt, LLP

(57) ABSTRACT

In order to prevent delays in error recovery, provided are an FEC packet generation unit configured to generate restoration data packets for restoration of lost data packets by using first data packets, which are data packets forming transmission data and which are transmitted as data packets of a first data stream, and second data packets, which are data packets forming the transmission data and which are transmitted as data packets of a second data stream different from the first data stream, and a packet transmission unit configured to transmit the restoration data packets based on transmissions of the first data packets and the second data packets.

14 Claims, 12 Drawing Sheets

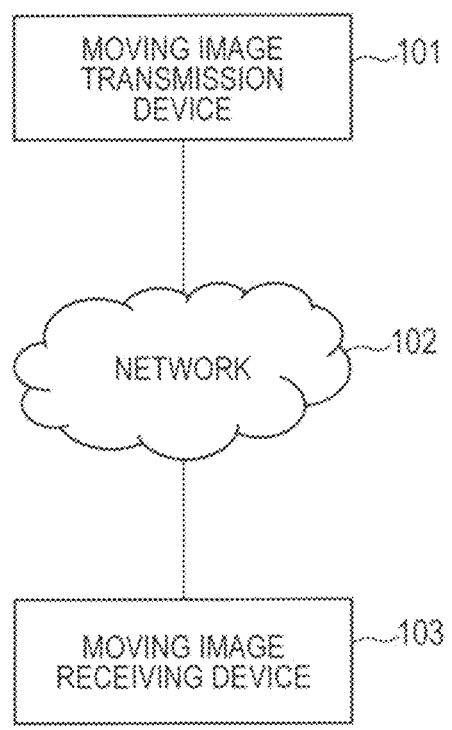

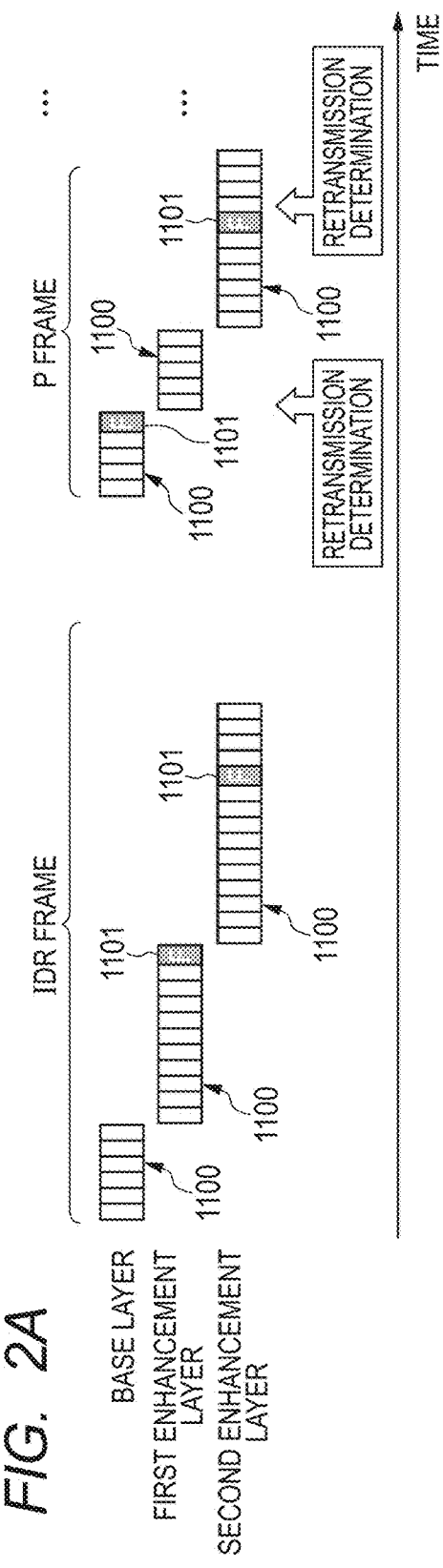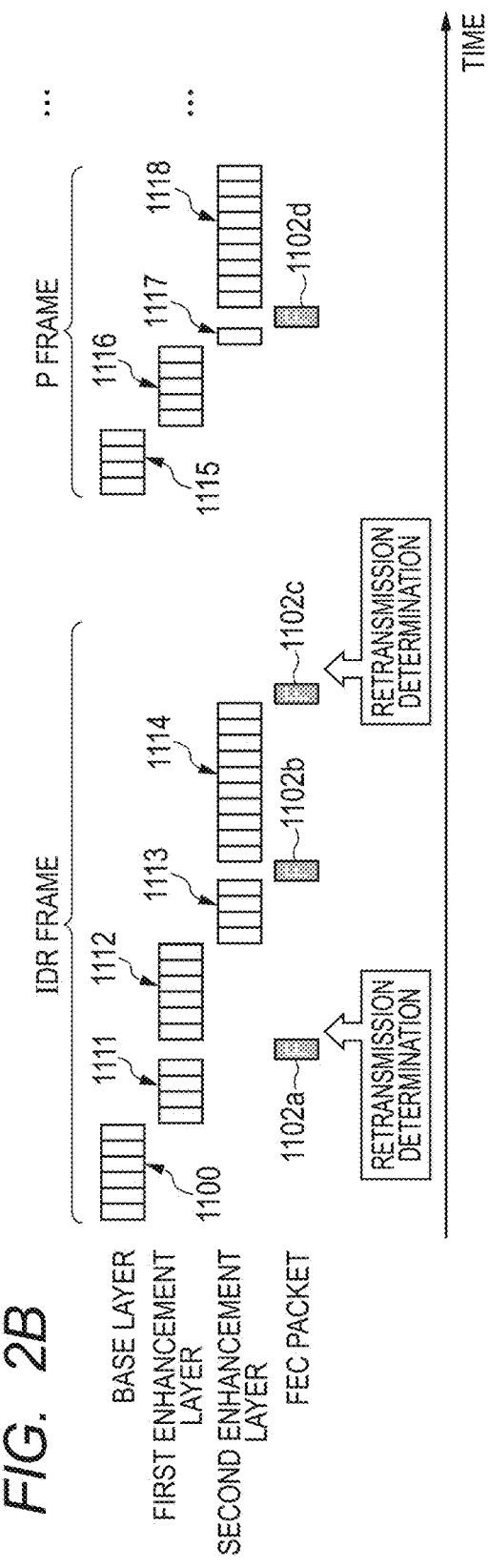

FIG. 6A

| FEC GROUP ID | GROUP MAXIMUM PACKET COUNT | FEC GROUP SEQUENCE NUMBER | GROUP REMAINING COUNT | STREAM 1 SELECTION FLAG | STREAM 2 SELECTION FLAG | STREAM 3 SELECTION FLAG |
| --- | --- | --- | --- | --- | --- | --- |
| 1 | 10 | 3456 | 5 | 1 | 1 | 1 |
| 2 | 5 | 2345 | 2 | 1 | 1 | 0 |

FIG. 6B

| FEC PACKET ID | STREAM 1 BASE SEQUENCE NUMBER | STREAM 1 SELECTION MASK | STREAM 2 BASE SEQUENCE NUMBER | STREAM 2 SELECTION MASK |
| --- | --- | --- | --- | --- |
| 1 | 1000 | 1010101010101010 | 4500 | 0101010101010101 |
| 2 | 1016 | 1000100010001000 | 4524 | 0111011101110111 |

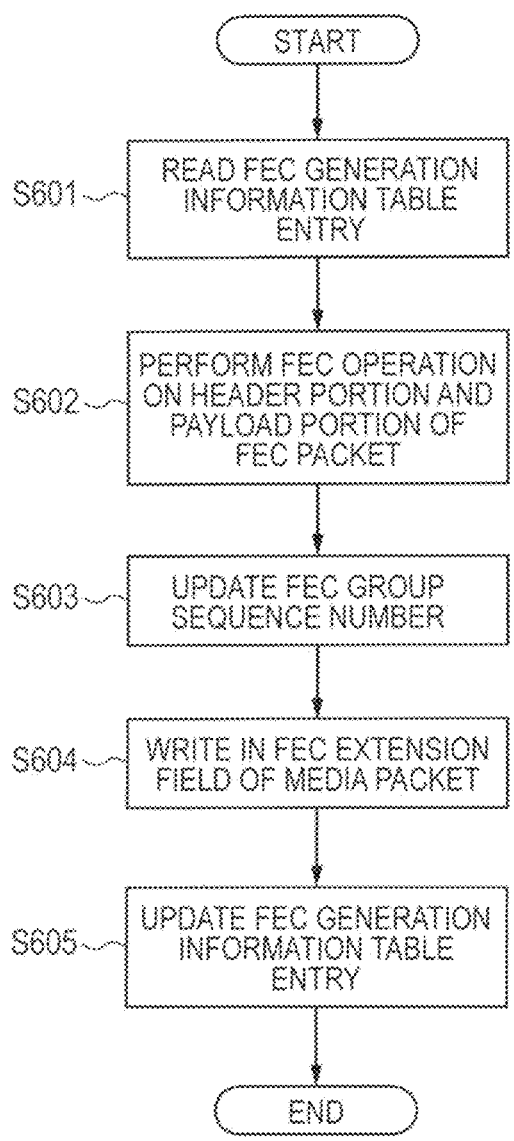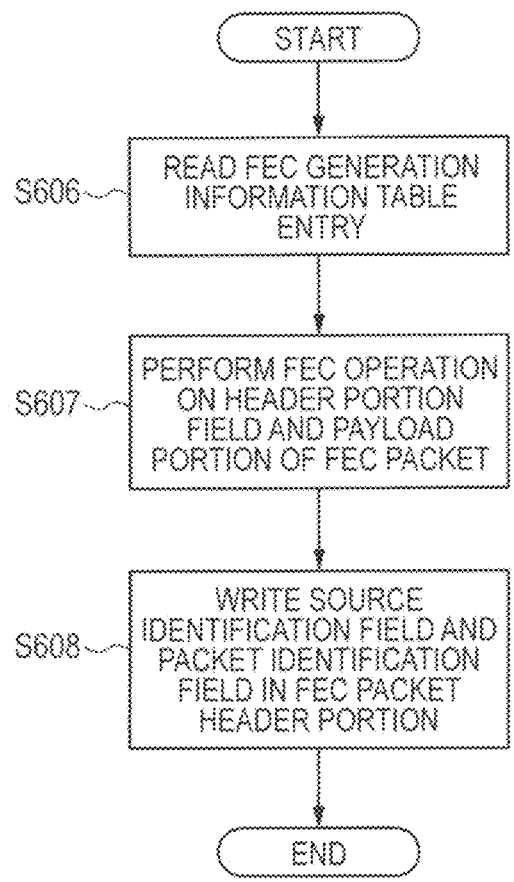

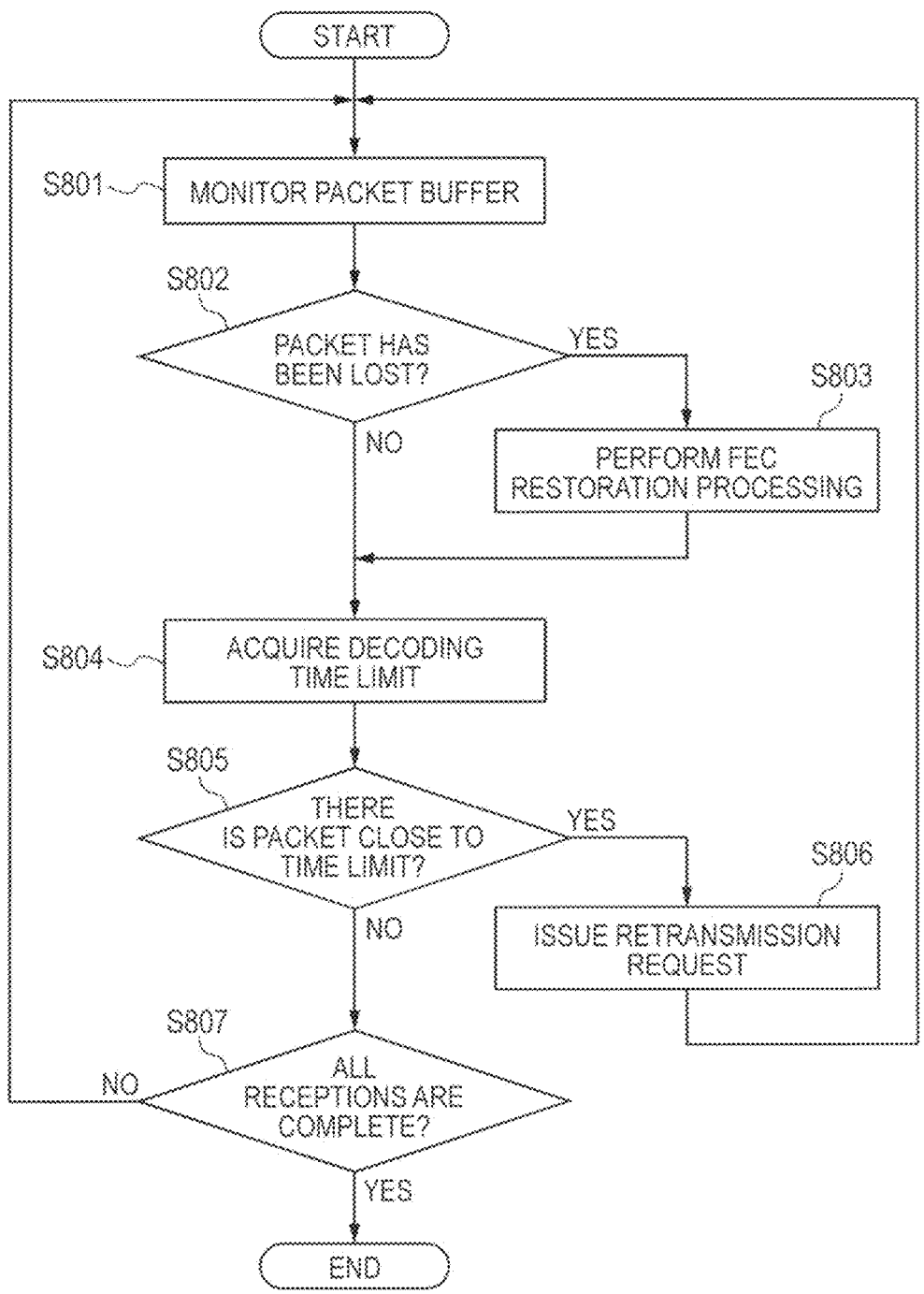

TRANSMISSION DEVICE, RECEIVING DEVICE, TRANSMISSION METHOD, AND RECEIVING METHOD

BACKGROUND OF THE INVENTION

Field of the Invention

The present invention relates to a transmission device configured to transmit stream data, a receiving device configured to receive stream data, a method of transmitting stream data, and a method of receiving stream data.

Description of the Related Art

In recent years, network transmission of moving image data is being utilized around the world. With the increasing number of pixels in videos and the increasing variety of utilization modes by users, there is a need for real time transmission of one piece of video data at a resolution and quality that meets the demands of the user by using a Scalable Video Codec (SVC), for example. Note that, SVC, which relates to a technology for hierarchical encoding (time hierarchical encoding) of moving image data relating to frame rate, has been proposed as an extension of H.264/AVC.

Further, Real-time Transport Protocol (RTP) is a leading standard technology for streaming moving image data in real time via the Internet or a local area network (LAN). In RTP, for the protocols of the session layers in a so-called Open Systems Interconnection (OSI) reference model, it is common for User Datagram Protocol (UDP) to be combined with a transport layer. The OSI reference model is a model developed by the International Organization for Standardization (ISO) that defines communication protocols divided into seven layers. Note that, UDP is an effective technology for real time streaming of moving image data. However, when the moving image data is corrupted on the receiving side due to packet loss during transmission, the quality of the obtained video image deteriorates.

Accordingly, in Japanese Patent Application Laid-Open No. 2010-141413, a technology is disclosed for using Forward Error Correction (FEC) during recovery of a lost packet in communication using RTP, which is a higher protocol of UDP. FEC is a technology for simultaneously transmitting, in addition to the packets of moving image data, data packets for restoring moving image data packets for which a transmission error has occurred. Note that, in the following description, the packets of moving image data are referred to as "media packets", and the data packets for restoring those media packets are referred to as "FEC packets". The FEC packets are generated by grouping one or more media packets and performing an FEC generation operation on those media packets. Examples of FEC generation operations that are mainly employed include an exclusive or (XOR) operation and a Reed-solomon operation. A method of designating the groups of media packets when generating the FEC packets is defined in "RTP Payload Format for Generic Forward Error Correction" of Request For Comments (RFC) 5109.

Further, as a countermeasure for a case in which more than a permissible level of media packets has been lost, and restoration by FEC cannot be performed, there is a method called hybrid automatic repeat request (ARQ) in which FEC and retransmission control are used together. In Japanese Patent Application Laid-Open No. 2010-141413, the use of transmission and retransmission control of FEC packets together is disclosed. Note that, retransmission control is a technology in which when packet loss has occurred, a request is issued by the receiving side to the transmission side for the lost packet, and the transmission side retransmits the packet to the receiving side. In hybrid ARQ, when the receiving side determines that a lost packet cannot be restored even by FEC, the receiving side issues a request to the transmission source for the packet.

In real time transmission of moving image data, the media packets need to be correctly transmitted, the transmission amount should not be excessive, and the processing from transmission of the media packets until decoding of the video data and the audio data needs to be executed in as short a time as possible. In order to satisfy those demands, hitherto, an appropriate amount of FEC packets is generated and transmitted for each of the video stream, the audio stream, and each media stream accompanying the video and audio streams.

In addition, in the case of SVC, video data is transmitted as a data stream to a base layer and as a data stream to one or more enhancement layers, respectively. For example, the data of the base layer and the enhancement layer(s) is transmitted based on a video resolution demanded by a user. In this case, in consideration of the fact that data in different resolutions is simultaneously being transmitted to a plurality of users, the streams of the base layer and the enhancement layer(s) are each transmitted as separate streams. Thus, in SVC, the data for one moving image is transmitted in a plurality of data streams, but the data amount of each stream is very different. For example, in the case of SVC moving image data when spatial scalability is employed, as the enhancement layer becomes higher from the base layer, the data amount of each layer becomes larger. Note that, the data amount for audio data is generally smaller than the data amount for video data.

However, even if there is a large difference in data amounts depending on the stream, in order to prevent a large increase in the overall transmission amount, the number of FEC packets with respect to the number of media packets cannot be greatly changed. Therefore, for a stream having a smaller data amount than a stream having a large data amount, the media packet groups for FEC generation are wider in a time axis direction. This fact can cause delays in FEC generation, as well as delays in the execution of retransmission requests when hybrid ARQ-based error restoration has failed, and as a result, lead to a deterioration in an ability to transmit in real time. Further, for a lower layer in SVC, because the data amount is small, the groups for FEC generation tend to be formed across a plurality of frames. In this case, error recovery cannot be performed until not only the packets of the frame in which the error occurred have arrived, but also until the packets of the next frame have arrived. This is also a factor in harming the ability to transmit in real time. In addition, in SVC, decoding of a higher layer cannot be completed unless decoding of the lower layer thereof is complete. Therefore, for example, failure or delay in the decoding of the lower layer has an impact on SVC video quality. Thus, in the case of a method such as SVC in which the data is divided into a plurality of layers and stream data is transmitted for each layer, the ability to transmit in real time can be harmed by delays in error recovery.

SUMMARY OF THE INVENTION

According to one embodiment of the present invention, there is provided a transmission device, including: a generation unit configured to generate restoration data packets for restoration of lost data packets by using first data packets, which are data packets forming transmission data and which are transmitted by a first data stream, and second data packets, which are data packets forming the transmission data and which are transmitted by a second data stream different from the first data stream; and a transmission unit configured to transmit to a receiving device the first data packets as data packets of the first data stream, transmit the restoration data packets based on transmissions of the first data packets and the second data packets.

According to the one embodiment of the present invention, a delay in error recovery may be prevented.

Further features of the present invention will become apparent from the following description of exemplary embodiments with reference to the attached drawings.

BRIEF DESCRIPTION OF THE DRAWINGS

FIG. 1 is a diagram for illustrating an overall configuration of a system including a transmission device, a receiving device, and a network.

FIG. 2A and FIG. 2B are diagrams for illustrating a transmission timing and a retransmission request timing of FEC packets.

FIG. 6A and FIG. 6B are diagrams for showing an FEC generation information table according to the first embodiment and a second embodiment of the present invention.

FIG. 7A and FIG. 7B are flowcharts of FEC operation processing according to the first embodiment and the second embodiment.

FIG. 9 is a flowchart of FEC restoration processing.

DESCRIPTION OF THE EMBODIMENTS

Figure 3:
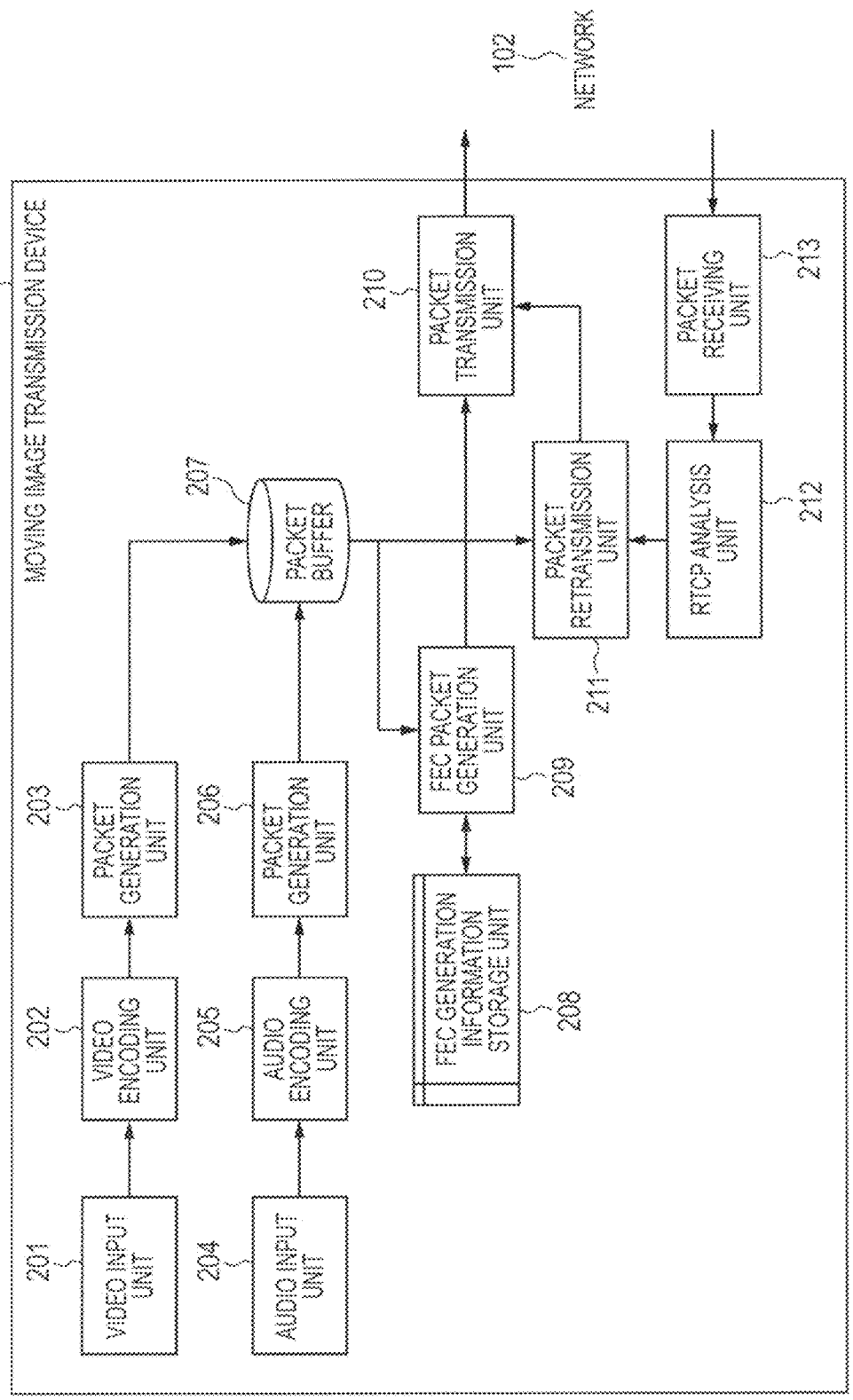
FIG. 3 is a diagram for illustrating a function block configuration of a transmission device according to embodiments of the present invention.

Preferred embodiments of the present invention will now be described in detail in accordance with the accompanying drawings.

First Embodiment

An example of transmitting and receiving moving image data and audio data as a plurality of stream data having different transmission rates from each other by using SVC technology as an example is now described. The present invention is not limited to using SVC technology. The present invention may be applied in cases in which data such as moving image data and audio data are transmitted by using a plurality of stream data. For example, instead of SVC technology, High Efficiency Video Coding (HEVC) technology may be employed. In this embodiment, in particular, stream data of moving images is described as an example. The stream data of moving images is divided into a plurality of data packets. In this embodiment, the data packets of the data stream of moving images are referred to as "media packets". Further, in this embodiment, in addition to media packets, restoration data packets for restoring media packets for which a transmission error has occurred are simultaneously transmitted. In this embodiment, an example is described in which packet restoration is performed based on error correction using forward error correction (FEC). Note that, in the following description, the restoration data packets for restoring the lost packets by FEC are referred to as "FEC packets".

In FIG. 1, an overall configuration example of a system including a moving image transmission device 101 (hereinafter referred to as "transmission device 101") and a moving image receiving device 103 (hereinafter referred to as "receiving device 103") according to this embodiment is illustrated. The transmission device 101 is connected to the receiving device 103 via a network 102. The transmission device 101 is, for example, a movie streaming server. The transmission device 101 has a function of transmitting streams of video data and audio data as RTP media packets, and a function of transmitting by RTP the FEC packets according to this embodiment generated in a manner described below for those media packets. Further, the transmission device 101 also has a packet retransmission function of retransmitting media packets designated to be retransmitted based on a retransmission request (RTCP negative acknowledgement) from the receiving device 103. The receiving device 103 is a client terminal, for example, configured to receive a moving image stream. The receiving device 103 has a function of receiving the media packets and FEC packets transmitted from the transmission device 101, and a function of, when there are lost data packets, restoring the lost data packets by using the FEC packets and the data packets that have not been lost. Further, the receiving device 103 has a function of issuing a request to the transmission device 101, which is the transmission source, to retransmit the media packets that are lacking due to loss and the like during streaming playback.

Now, before describing the transmission device 101 and the receiving device 103 illustrated in FIG. 1 in detail, in order to facilitate understanding of the FEC packets generated by the transmission device 101 according to this embodiment, first, a simple description is provided of the FEC packets and the layers in the SVC.

In SVC, as described above, in consideration of the fact that data in different resolutions is simultaneously being transmitted to a plurality of users, the data streams of the base layer and each enhancement layer are each transmitted as separate streams. The transmission data includes data of the base layer to be used for displaying by the receiving device an image having a first resolution, and data of an enhancement layer to be used together with the data of the base layer for displaying by the receiving device an image having a second resolution that is higher than the first resolution. The transmission device is configured to transmit the data of the base layer in a first data stream. Further, the transmission device is configured to transmit the data of the enhancement layer in a second data stream. As described above, in SVC, for each frame, decoding of a higher layer cannot be completed without the data of the lower layer thereof. More specifically, in SVC, because the data of a higher layer is differential data with respect to the lower layer, the data of the lower layer is transmitted first, and the data of the higher layer is transmitted after that. Then, the data of the lower layer is decoded first, and the data of the higher layer is decoded based on the decoded data of the lower layer. In other words, the lower layer has a higher transmission priority than the higher layer. Thus, in SVC, the stream data of each layer is data that is related to the stream data of each of the other layers.

Further, as described above, as the enhancement layer becomes higher from the base layer, the data amount of each layer becomes larger. However, as stated above, due to a limitation in the overall transmission amount, the number of FEC packets with respect to the number of media packets cannot be greatly changed. Therefore, as described later with reference to FIG. 2A, for a lower layer having a smaller data amount, the group of media packets for FEC generation is wider in the time axis direction. In particular, for a lower layer in SVC, because the data amount is small, the groups for FEC generation tend to be formed across a plurality of frames (split across a plurality of frames).

Further, as described above, the FEC packets are generated by grouping one or more media packets and performing an FEC generation operation on those media packets. In this embodiment, a group of a plurality of media packets on which the FEC operation is to be performed is referred to as an "FEC group". In RFC 5109, the stream is designated based on a Synchronization Source (SSRC), which is identification information (identifier) that allows the stream of the media packets to be identified. In addition, the media packets to be included in the FEC group from among the stream are specified by designating an RTP sequence number thereof, which is packet identification information that allows the media packets to be specified. Note that, media packets that can be designated by one FEC packet, namely, media packets that can be designated as one FEC group, have the same SSRC, and have a maximum of 48 consecutive RTP sequence numbers.

In FIG. 2A, an example is illustrated of the reception timing of the FEC packets and the timing at which a retransmission determination can be made on failure FEC restoration processing, when transmitting stream data in three layers in the SVC standard. In FIG. 2A, one packet is represented as a rectangle, and in particular, the FEC packets among those packets are marked with the letter "F". Further, in the SVC standard, as described above, decoding of a higher layer cannot be completed without the data of the lower layer thereof. As a result, in SVC, for each frame, transmission of the stream of a first enhancement layer is performed after completion of transmission of the stream of the base layer, and transmission of the stream of a second enhancement layer is performed after completion of transmission of the stream of the first enhancement layer.

In the example illustrated in FIG. 2A, the stream data includes an instantaneous decoder refresh (IDR) frame and a predicted (P) frame. Note that, the IDR frame and the P frame are frames determined based on the advanced coding (AVC) standard. The data of the IDR frame and the data of the P frame each include data of the base layer, data of the first enhancement layer, and data of the second enhancement layer. In the example illustrated in FIG. 2A, for each of the base layer, the first enhancement layer, and the second enhancement layer, one FEC packet 1101 is generated and transmitted for one FEC group, which includes ten media packets 1100. In the example illustrated in FIG. 2A, the number of media packets of the base layer forming the IDR frame is six. In order to generate one FEC packet by using the media packets of the base layer, it is necessary to use a total of ten media packets, specifically, the six media packets of the base layer forming the IDR frame and four media packets of the base layer forming the P frame. Further, in the example illustrated in FIG. 2A, the number of media packets of the second enhancement layer forming the IDR frame is 14. Therefore, one FEC packet is generated by using ten of the 14 media packets. Next, one FEC packet is generated by using the remaining four media packets and six media packets of the second enhancement layer forming the P frame. Thus, in the example illustrated in FIG. 2A, the FEC group for the base layer and the second enhancement layer is divided into the IDR frame and the P frame. As a result, in the case of the example illustrated in FIG. 2A, for the base layer and the second enhancement layer, for example, the timing at which a determination can be made of whether or not FEC restoration has failed and whether or not a request needs to be retransmitted is after the arrival of the FEC packet in the next P frame after the IDR frame.

In other words, in the case of the FEC generation as illustrated in FIG. 2A, it may become more difficult to control error recovery with an appropriate number of FEC packets while ensuring the ability to transmit in real time for the transmission of data formed by a plurality of streams having different data amounts.

As a result, the transmission device 101 according to this embodiment is configured to form FEC groups by gathering a set number of media packets in chronological order of when each of the media packets is to be transmitted, from among the plurality of media packets included in the stream of each layer. Further, the transmission device 101 generates the FEC packets from those FEC groups having the set number of media packets.

In FIG. 2B, the FEC packets generated by the transmission source when transmitting stream data in three layers, and the timing at which a retransmission determination can be made on failure of FEC restoration processing at the receiving side according to this embodiment are illustrated. In FIG. 2B, similar to the example illustrated in FIG. 2A, one packet is represented as a rectangle, and among those packets, the FEC packets in particular are marked with the letter "F". Further, in FIG. 2B, stream transmission of each layer is also performed for each frame, based on a transmission priority order of each layer as in FIG. 2A. In other words, for each frame, the stream data is transmitted by transmitting, in order, the stream of the base layer, then the stream of the first enhancement layer, and then the stream of the second enhancement layer.

However, in the case of FIG. 2B, the FEC groups are formed including a predetermined number of data packets to be transmitted within a part of the transmission period of the transmission data, and the FEC packets of the restoration data are generated based on the data packets included in the FEC groups. The FEC groups are formed by gathering a set number of media packets in chronological order of transmission from among the plurality of media packets included in the respective streams of each layer. In other words, in the case of this embodiment, the FEC groups are formed by gathering the set number of media packets in chronological order of transmission so as to be formed across each layer. Note that, in the example illustrated in FIG. 2B, as an example, ten is used as the set number of media packets forming the FEC groups.

Further, in the case of FIG. 2B, the FEC packets are generated by performing an FEC operation using the ten media packets gathered in chronological order of transmission from among the plurality of media packets included in each layer. In other words, in the case of FIG. 2B, in the IDR frame, ten media packets in chronological order of transmission, including six media packets 1110 of the base layer and four media packets 1111 of the first enhancement layer, are used to form one FEC group. An FEC packet 1102a is then generated from those ten media packets in chronological order of transmission included in the FEC group split across the base layer and the first enhancement layer. Next, ten media packets in chronological order of transmission, including six media packets 1112 of the first enhancement layer and four media packets 1113 of the second enhancement layer, are used to form one FEC group. An FEC packet 1102b is then generated from those ten media packets in chronological order of transmission included in the FEC group split across the first enhancement layer and the second enhancement layer. In addition, in the case of FIG. 2B, the next ten media packets in chronological order of transmission are the ten media packets 1114 of the second enhancement layer. As a result, those ten media packets 1114 are used to form one FEC group, and an FEC packet 1102c is generated from the formed FEC group. In the P frame, ten media packets in chronological order of transmission, including four media packets 1115 of the base layer, five media packets 1116 of the first enhancement layer, and one media packet 1117 of the second enhancement layer, are used to form one FEC group. An FEC packet 1102d is then generated from those ten media packets in chronological order of transmission included in the FEC group split across the base layer, the first enhancement layer, and the second enhancement layer. The same processing is then performed on the following media packets 1118 onwards. In other words, in the case of the example illustrated in FIG. 2B, an FEC group that is split across (formed across) the IDR frame and the P frame such as shown in FIG. 2A is not generated. Thus, the restoration data packets for restoring lost data packets are generated by using first data packets and second data packets. The "first data packets" are data packets that form the transmission data and that are to be transmitted by the first data stream. Further, the "second data packets" are data packets that form the transmission data and that are to be transmitted by the second data stream, which is different from the first data stream.

Further, the FEC packets generated as described above according to this embodiment can be, as an example, transmitted by a layer separately prepared for FEC packet transmission. In addition, the FEC packets may also be transmitted by, for example, adding the FEC packets to the stream of media packets of the base layer. Still further, the FEC packets may be transmitted by adding the FEC packets to a stream for audio data, for example. Although described in more detail later, in this embodiment, identification information such as that described later that allows each media packet, each FEC group, and each stream to be identified is described in an extension area of a header of the RTP media packets. As a result, according to this embodiment, the media packets forming the FEC groups, and the stream in which those media packets are included, can be specified.

Comparing the example illustrated in FIG. 2B according to this embodiment and the above-mentioned example illustrated in FIG. 2A of FEC packets based on the SVC standard, it can be seen that in the case of FIG. 2A, for the base layer and the second enhancement layer, one FEC group is split across the IDR frame and the P frame. Therefore, in the case of the example illustrated in FIG. 2A, as described above, for the base layer and the second enhancement layer, the timing at which a determination can be made on a retransmission request due to failure of FEC restoration on the receiving side is after the arrival of the FEC packet in the next P frame after the IDR frame. In contrast, in the case of FIG. 2B according to this embodiment, a determination of whether or not a retransmission request is necessary is performed on the receiving side for each FEC group formed from the set number of media packets in chronological order of transmission, without differentiating among the streams of each of the layers. In other words, in the case of the example illustrated in FIG. 2B, the determination made on the receiving side of whether or not FEC restoration has failed and whether or not a retransmission request is necessary can be made at a timing immediately after reception of the set number of media packets in chronological order of transmission that are to be included in the FEC group according to this embodiment. In the case of the example illustrated in FIG. 2B, the timing of the determination regarding whether or not FEC restoration has failed and whether or not a retransmission request is necessary is within the IDR frame. Unlike the case of FIG. 2A, this determination is not delayed until the next P frame. Thus, in the example illustrated in FIG. 2B, for streaming requiring the ability to transmit in real time, for example, when error recovery fails and a packet retransmission request is issued, the receiving side can issue the retransmission request earlier that in the example illustrated in FIG. 2A. Further, in the example illustrated in FIG. 2B, when a plurality of streams having different data amounts are transmitted, temporal unevenness in the media packets required for error recovery is suppressed while also maintaining the ratio of the FEC data amounts (number of FEC packets) at a roughly fixed level. Therefore, in this embodiment, error recovery is easy, and rapid real time streaming can be performed. Thus, according to this embodiment, when transmitting stream data having different data amounts for each layer, error recovery control by FEC on the appropriate data amount can be realized while ensuring the ability to transmit in real time. In other words, in this embodiment, delays in error recovery by FEC can be prevented and the overall amount of the transmission data can be controlled more efficiently.

Next, a detailed configuration of the transmission device 101 according to this embodiment that enables FEC packet generation such as that illustrated in FIG. 2B is described with reference to FIG. 3. A part or all of the functions of each of the blocks in FIG. 3 may be realized by, as an example, hardware. Note that, a packet buffer 207 (hereinafter referred to as "buffer 207") of FIG. 3 is, for example, a hard disk drive (HDD) or a large-capacity semiconductor memory. An FEC generation information storage unit 208 (hereinafter referred to as "storage unit 208") is a memory and the like configured to store an FEC generation information table, which is described later. Further, a part or all of the functions of each of the blocks in FIG. 3 may be realized by, as an example, a processor executing programs recorded on a recording medium. The drawings and description relating to a configuration example in the case of realizing the functions of each of the blocks in FIG. 3 by using a processor to execute programs are described later.

In the transmission device 101 illustrated in FIG. 3, a video input unit 201 is configured to acquire video data from a data storage device (not shown), for example. The video data input to the video input unit 201 is transmitted to a video encoding unit 202. The video encoding unit 202 is configured to compress and encode the video data to form a plurality of stream data that are streamed in a plurality of layers such as those described above. The video encoding unit 202 is configured to output the plurality of stream data to a packet generation unit 203. The packet generation unit 203 is configured to divide the stream data formed from the compressed and encoded video data into packet data for RTP transmission, and output the packet data for RTP transmission to the buffer 207. Note that, to facilitate the following description, packet data is hereinafter referred to as a "packet". The buffer 207 is configured to store packets. An audio input unit 204 is configured to acquire audio data from a data storage device (not shown) or the like. The audio data input to the audio input unit 204 is transmitted to an audio encoding unit 205. The audio encoding unit 205 is configured to compress and encode the audio data, and output the compressed and encoded audio data to a packet generation unit 206. The packet generation unit 206 is configured to divide stream data formed from the compressed and encoded audio data into packets for RTP transmission, and output the packets for RTP transmission to the buffer 207. The buffer 207 is configured to store the packets. In FIG. 3, the packets stored in the buffer 207 correspond to the above-mentioned media packets.

An FEC packet generation unit 209 is configured to generate an FEC packet by sequentially reading each of the media packets to be included in the FEC group with reference to an FEC generation information table, which is described later, in the storage unit 208 from among the media packets stored in the buffer 207. Note that, the details of the FEC generation table are described later. Further, the FEC packet generation unit 209 is configured to transfer the media packets on which FEC generation processing has been performed to a packet transmission unit 210. The packet transmission unit 210 is configured to transmit the media packets to the receiving device 103. In addition, the FEC packet generation unit 209 is configured to transfer FEC packets for which generation based on FEC generation processing is complete to the packet transmission unit 210. The packet transmission unit 210 is configured to transmit the FEC packets to the receiving device 103. Further, the FEC packet generation unit 209 is configured to transmit the FEC packets to the buffer 207. The buffer 207 is configured to store the FEC packets. The details of the FEC packet generation processing performed by the FEC packet generation unit 209 are described later.

A packet receiving unit 213 is configured to receive a packet when that packet has been transmitted from the receiving device 103. The packet receiving unit 213 is configured to issue, when the received packet is an RTCP packet, a request to an RTCP analysis unit 212 for analysis processing of that RTCP packet. The RTCP analysis unit 212 is configured to analyze RTCP packets. The RTCP analysis unit 212 is configured to issue, when the analyzed RTCP packet is a retransmission request (RTCP negative acknowledgement) packet, a request to a packet retransmission unit 211 for retransmission of the media packets for which a retransmission request has been issued. The packet retransmission unit 211 is configured to read from the buffer 207 the media packets for which a retransmission request has been issued, and issue a request to the packet transmission unit 210 to transmit the read media packets to the receiving device 103. Based on the request, the packet transmission unit 210 transmits the media packets for which a retransmission request has been issued to the receiving device 103.

Next, a flow of the processing in the transmission device 101 according to this embodiment until the FEC packet generation unit 209 generates and transmits an FEC packet is described with reference to the flowchart of FIG. 4.

Figure 4:
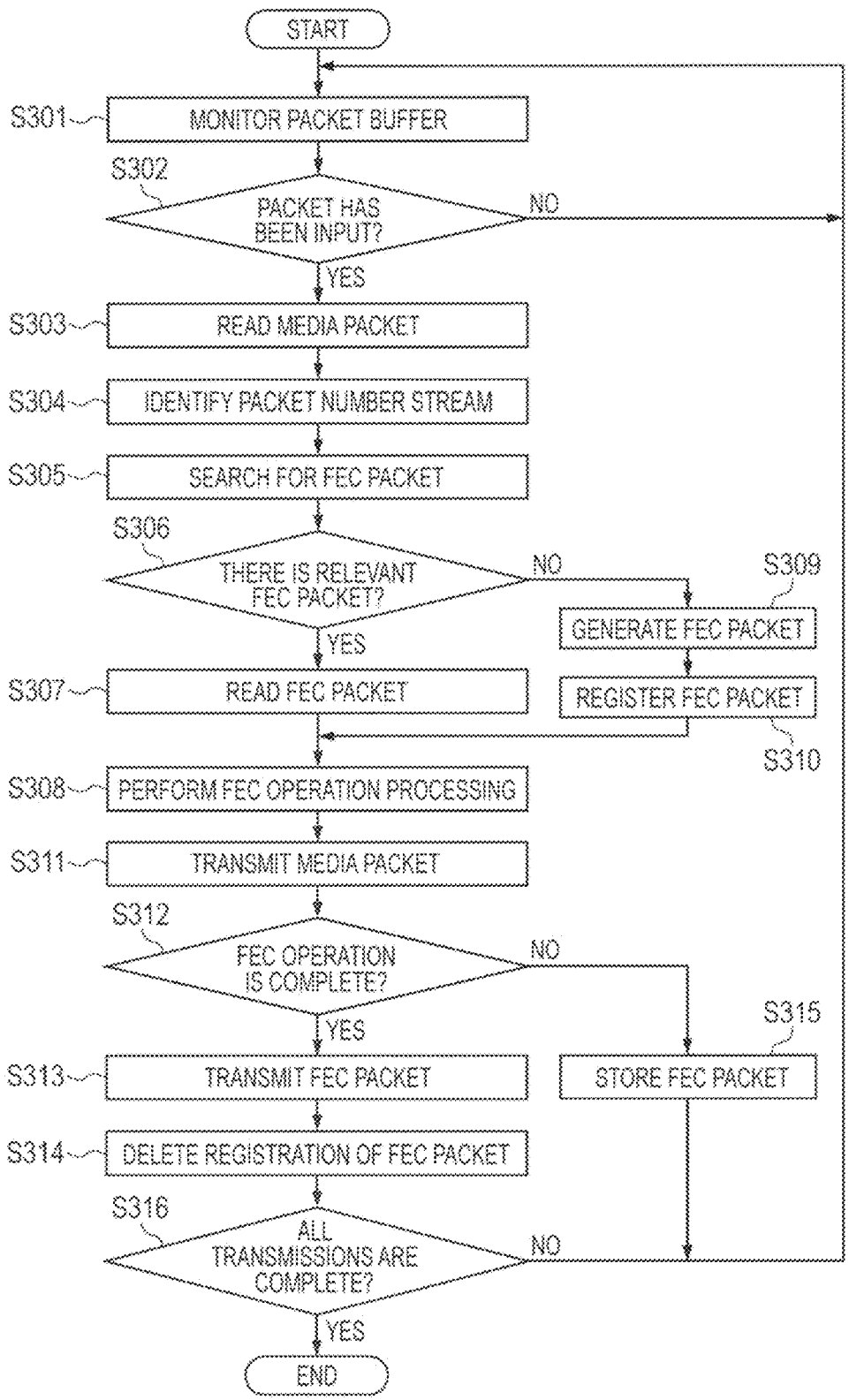
FIG. 4 is a flowchart of FEC generation processing.

In FIG. 4, in Step S301, the FEC packet generation unit 209 monitors the buffer 207. Further, in Step S302, the FEC packet generation unit 209 determines whether or not there has been an input of a media packet from the packet generation unit 203 or 206 to the buffer 207. When it is determined in Step S302 that there has not been an input of a media packet, the FEC packet generation unit 209 returns the processing to Step S301, and monitors the buffer 207. On the other hand, when it is determined in Step S302 that there has been an input of a media packet, the FEC packet generation unit 209 advances the processing to Step S303.

In Step S303, the FEC packet generation unit 209 reads the media packet from the buffer 207. After Step S303, the FEC packet generation unit 209 advances the processing to Step S304. In Step S304, the FEC packet generation unit 209 extracts the RTP sequence number, which is media packet identification information, and the SSRC, which is stream identification information, from the extension area of the header of the media packet. Note that, the details of the extension area of the header are described later. Following Step S304, the FEC packet generation unit 209 advances the processing to Step S305.

In Step S305, the FEC packet generation unit 209 searches the FEC generation information table in the storage unit 208 by using the extracted RTP sequence number and stream identifier as a search key. After Step S305, the FEC packet generation unit 209 advances the processing to Step S306.

In Step S306, based on the search result of the FEC generation information table, the FEC packet generation unit 209 determines whether or not the FEC packet of the FEC group that the media packet read in Step S303 belongs to has already been created and is stored in the buffer 207. When it is determined in Step S306 that the relevant FEC packet has been created and is stored in the buffer 207, the FEC packet generation unit 209 advances the processing to Step S307.

In Step S307, the FEC packet generation unit 209 reads the FEC packet from the buffer 207. After Step S307, the FEC packet generation unit 209 advances the processing to Step S308.

On the other hand, when it is determined in Step S306 that the relevant FEC packet does not exist, the FEC packet generation unit 209 advances the processing to Step S309. In other words, when it is determined in Step S306 that the relevant FEC packet does not exist, this means that the media packet read in Step S303 is a media packet that is not in an FEC group of the created FEC packet. In Step S309, the FEC packet generation unit 209 newly generates an FEC packet, and then advances the processing to Step S310. In Step S310, the FEC packet generation unit 209 registers information on the newly generated FEC packet in the FEC generation information table. After Step S310, the FEC packet generation unit 209 advances the processing to Step S308.

In Step S308, the FEC packet generation unit 209 performs an FEC data generation operation by referring to the media packet read in Step S303. After Step S308, the FEC packet generation unit 209 advances the processing to Step S311.

In Step S311, the FEC packet generation unit 209 outputs the media packet for which the FEC operation performed in Step S308 has finished to the packet transmission unit 210. Further, the FEC packet generation unit 209 at this stage writes, in a manner described later, identification information on the FEC group, stream identification information, packet identification information, and the like in the extension area of the header portion of the media packet. Then, the media packet is transmitted from the packet transmission unit 210 to the receiving device 103. After Step S311, the FEC packet generation unit 209 advances the processing to Step S312.

In Step S312, the FEC packet generation unit 209 determines whether or not the FEC operation is complete for all of the media packets to be included in the FEC group. When it is determined that the FEC operation is complete for all of the media packets to be included in the FEC group, the FEC packet generation unit 209 advances the processing to Step S313. On the other hand, when it is determined that the FEC operation is not complete for all of the media packets to be included in the FEC group, the FEC packet generation unit 209 advances the processing to Step S315.

In Step S315, the FEC packet generation unit 209 stores the FEC packet of the FEC data generated by the FEC generation operation performed in Step S308 in the buffer 207. After Step S315, the FEC packet generation unit 209 returns the processing to Step S310.

On the other hand, in Step S313, the FEC packet generation unit 209 outputs the FEC packet to the packet transmission unit 210. As a result, the FEC packet is transmitted from the packet transmission unit 210 to the receiving device 103. In other words, the FEC packet is transmitted to the receiving device 103 immediately after transmission of each of the media packets to be included in the FEC group. After Step S313, the FEC packet generation unit 209 advances the processing to Step S314.

In Step S314, the FEC packet generation unit 209 deletes the registration of the relevant FEC packet from the FEC generation information table in the storage unit 208. After Step S314, the FEC packet generation unit 209 advances the processing to Step S316.

In Step S316, the FEC packet generation unit 209 determines whether or not the FEC operation has finished for all of the media packets of all of the streams, and whether or not transmission of all of those media packets and the FEC packets for which FEC operation has finished is complete. When it is determined that not all of the transmissions are complete, and that there are some unprocessed media packets remaining, the FEC packet generation unit 209 returns the processing to Step S301. On the other hand, when it is determined that all of the transmissions are complete, the FEC packet generation unit 209 finishes the packet generation processing.

Next, the FEC operation processing performed by the FEC packet generation unit 209 in Step S308 of FIG. 4 is described in more detail with reference to FIG. 5A, FIG. 5B, FIG. 6A, and FIG. 7A.

Figure 5A:
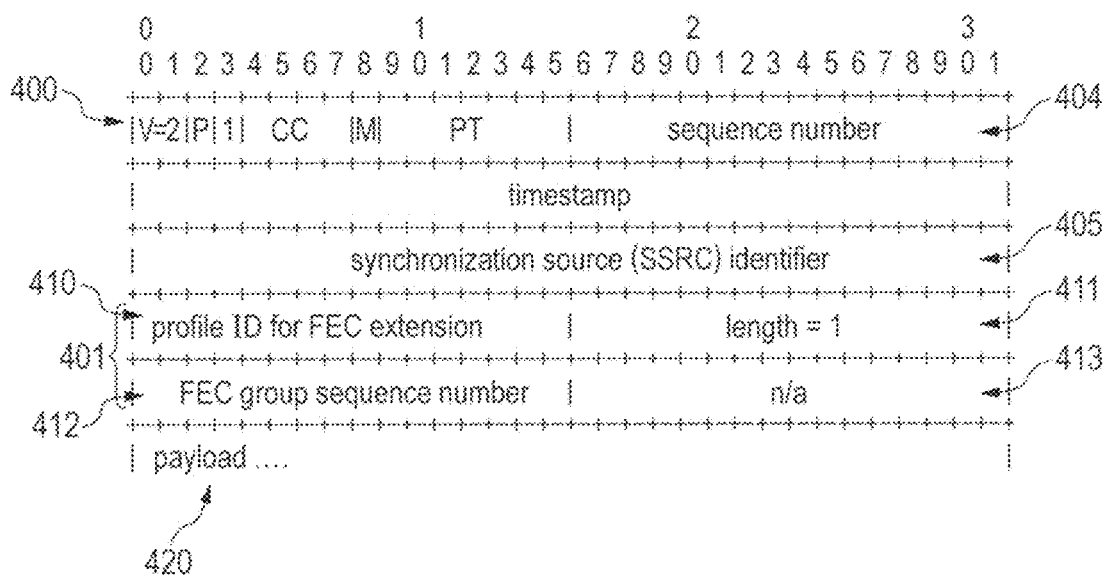
FIG. 5A and FIG. 5B are diagrams for illustrating a configuration of an extension area of an RTP header portion according to a first embodiment of the present invention.
Figure 5B:
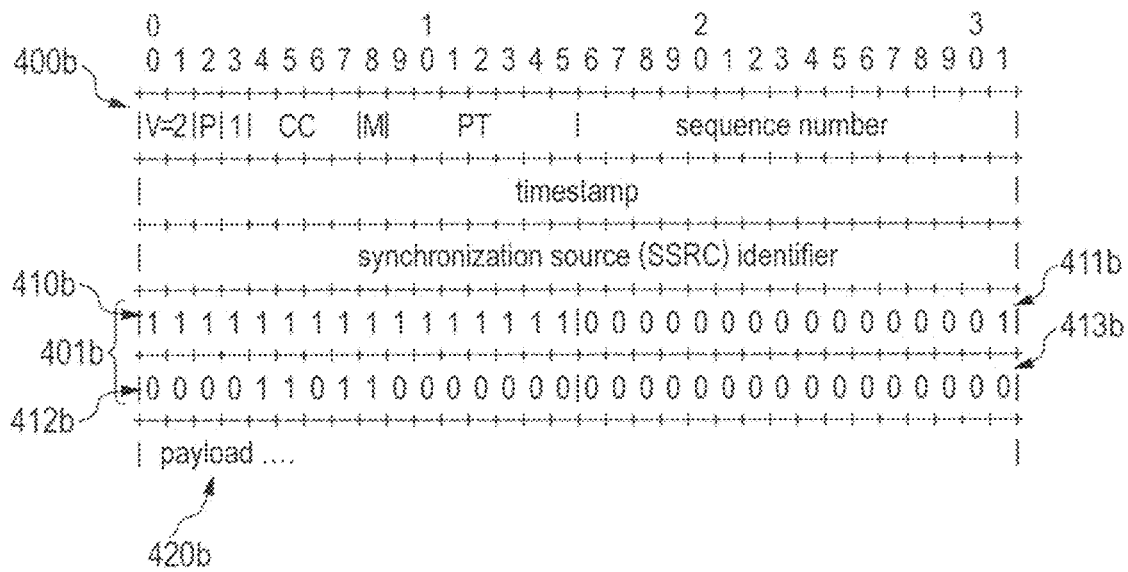

FIG. 5A and FIG. 5B are diagrams for illustrating a format of an RIP header 400 of the media packets according to this embodiment. Note that, each of the fields illustrated in FIG. 5A and FIG. 5B are the same. However, in particular for the example illustrated in FIG. 5B, an example is illustrated in which specific numerical values have been written into each field. In the case of FIG. 5B, in order to distinguish FIG. 5B from FIG. 5A, a small "b" is added to each reference number in each field. The example illustrated in FIG. 5A is now described below.

In FIG. 5A, a header extension area of a standard RIP packet is illustrated. The SSRC is written in an SSRC field 405, and the RIP sequence number is written in a sequence number field 404. As described above, the SSRC is stream identification information (identifier) on the media packets, and based on this SSRC, the stream is identified. Further, as described above, based on the RIP sequence number, which is packet identification information, the media packets are specified. In other words, by utilizing the header extension area of a standard RIP packet, an RIP sequence number for specifying each media packet such as illustrated in FIG. 2B can be designated. Further, the SSRC for specifying the stream that each media packet belongs to can be designated.

In addition, in this embodiment, a part of the header extension area of the RIP packet is used as an FEC extension field 401. In this embodiment, the FEC extension field 401 includes a two-byte profile ID for FEC extension field 410, a 32-bit words count field 411, a two-byte FEC group sequence number field 412, and a two-byte unused field 413. Note that, the unused field (n/a) 413 is inserted because, for convenience, it is preferred that the total size of the header extension area be a factor of four. A payload portion 420 is an area in which the actual data is written.

The FEC group sequence number is, unlike the RIP stream sequence number, a consecutive number that is shared with the media packets of the stream of each layer belonging to the same FEC group. In other words, the FEC group sequence number is group identification information for identifying the FEC group. The FEC group sequence number allows each media packet of an FEC group that is formed across streams of respective layers such as is illustrated in FIG. 2B to be uniquely specified regarding which FEC group the media packet belongs to. Note that, the format of the FEC packets in this embodiment is the same as the definition in RFC 5109, and hence a description thereof is omitted here.

The profile ID for FEC extension is identification information (identifier) for identifying the fact that a header extension area is being used as the FEC extension field of this embodiment. The 32-bit words count (length) is the number of 32-bit words in the data portion of the FEC extension field 401.

FIG. 6A is a diagram for showing an example of the written content of the FEC generation information table according to this embodiment. Each entry registered in the FEC generation information table includes an FEC group ID, a group maximum packet count, an FEC group sequence number, a group remaining count, a stream 1 selection flag, a stream 2 selection flag, and a stream 3 selection flag. Note that, in FIG. 6A, the values for the selection flags of streams 1, 2, and 3 are represented in binary form, and the values for all the other fields are represented in decimal form.

In the example shown in FIG. 6A, the group maximum packet count indicates the number of media packets belonging to the FEC group of the relevant entry. In the case of the entry in FIG. 6A having an FEC group ID of "1", "10" is registered as the group maximum packet count, and hence the number of media packets belonging to the FEC group is ten.

For the FEC group sequence number in FIG. 6A, the number written in the FEC group sequence number field 412 of the FEC extension field 401 illustrated in FIG. 5A is registered. The group maximum packet count in FIG. 6A indicates the number of media packets included in one FEC group. In the example shown in FIG. 6A, the FEC group having "1" as an ID is indicated as including ten media packets. Further, a sequence number for distinguishing each of the media packets included in the same FEC group is written in the column of the FEC group sequence number in FIG. 6A. The sequence number in the column of the FEC group sequence number in FIG. 6A is updated each time FEC operation processing is performed on a media packet. In other words, the sequence number in the column of the FEC group sequence number is written over with the sequence number of the media packet for which FEC operation processing is newly completed. In the case of the entry in FIG. 6A having an FEC group ID of "1", the FEC group sequence number is the value "3456". In this case, the value "0000110110000000" expressed in binary is written in the FEC group sequence number field 412 in FIG. 5B as a representation of "3456" in decimal.

The group remaining count in FIG. 6A indicates the number of remaining media packets on which FEC operation processing has not yet been performed for the FEC group of that entry. In the case of the entry in FIG. 6A having an FEC group ID of "1", the group remaining count is "5", and hence five media packets remain on which FEC operation processing has not yet been performed.

The stream 1 selection flag in FIG. 6A corresponds to the stream of the base layer in FIG. 2B, for example. When "1" is indicated for the stream 1 selection flag, this means that a media packet belonging to the FEC group of the entry is included in the stream of the base layer. The stream 2 selection flag corresponds to the stream of the first enhancement layer in FIG. 2B, for example. When "1" is indicated for the stream 2 selection flag, this means that a media packet belonging to the FEC group of the entry is included in the stream of the first enhancement layer. The stream 3 selection flag corresponds to the stream of the second enhancement layer in FIG. 2B, for example. When "1" is indicated for the stream 3 selection flag, this means that a media packet belonging to the FEC group of the entry is included in the stream of the second enhancement layer. In the case of the entry in FIG. 6A having an FEC group ID of "1", because "1" is indicated for each flag, the FEC group of this entry includes media packets from the base layer, the first enhancement layer, and the second enhancement layer.

In the case of the entry in FIG. 6A having an FEC group ID of "1", each of the values such as an those in an FEC extension field 401b of a header 400b illustrated in FIG. 5B are written in the FEC extension field of the RTP header portion. In other words, in FIG. 5B, in a profile ID for FEC extension field 410b, a value containing 16 bits of "1"s is written as an extension flag for clearly indicating use of the extension field. Further, in an FEC group sequence number field 412b, a 16-bit value of "0000110110000000" representing the FEC group sequence number "3456" in FIG. 6A is written. In addition, in a 32-bit words count field 411b, a 16-bit value "0000000000000001" representing a byte count of "1" is written. Note that, an unused field 413b contains only "0"s.

FIG. 7A is a flowchart for illustrating a detailed processing flow of the FEC operation processing performed in Step S308 of FIG. 4. The FEC operation processing performed by the FEC packet generation unit 209 according to this embodiment is now described with reference to the flowchart of FIG. 7A.

In FIG. 7A, first, in Step S601, the FEC packet generation unit 209 according to this embodiment reads information on the relevant entry from the FEC generation information table of FIG. 6A. After Step S601, the FEC packet generation unit 209 advances the processing to Step S602.

In Step S602, the FEC packet generation unit 209 performs an FEC operation (XOR operation) on the header portion and the payload portion of the FEC packet. After Step S602, the FEC packet generation unit 209 advances the processing to Step S603.

In Step S603, the FEC packet generation unit 209 updates the value of the FEC group sequence number in the FEC generation information table of FIG. 6A. After Step S603, the FEC packet generation unit 209 advances the processing to Step S604.

In Step S604, the FEC packet generation unit 209 writes the FEC information (profile ID for FEC extension, byte count, and FEC group sequence number) in the FEC extension field of the media packet. After Step S604, the FEC packet generation unit 209 advances the processing to Step S605.

In Step S605, the FEC packet generation unit 209 updates the information on the relevant entry in the FEC generation information table of FIG. 6A. When the processing of Step S605 is complete, the FEC packet generation unit 209 finishes the FEC operation processing of Step S308 in the flowchart of FIG. 4, and advances the processing to Step S309 of FIG. 4.

Based on the processing described above, the transmission device 101 according to this embodiment can transmit to the receiving device 103 each media packet and the FEC packets generated using the media packets of an FEC group that is formed across a plurality of streams such as described above.

Note that, in this embodiment, a part of the extension area of the header portion of the RTP packets is used as an FEC extension field, and an FEC group sequence number and the like are added to that field. As a result, there may be an impact on network utilization efficiency due to a decrease in the payload length. However, the payload length of the RTP media packets is reduced by from 14 bytes to 18 bytes in order to match the maximum payload length of the FEC packets. The eight bytes of the FEC extension field used in this embodiment is smaller than that reduction, and hence the payload length of the media packets is not reduced in this embodiment. Therefore, there is no impact on network utilization efficiency even when a part of the extension area of the header portion of the RTP packets is used as an FEC extension field, as is the case in the this embodiment. Further, according to the specification of the RTP standard, if the extension field of the header portion of the RTP packets is not supported, the extension field may be ignored. As a result, in terms of the specification, there is no problem in adding the FEC group sequence number and the like to the FEC extension field of the header portion of the media packets.

Figure 8:
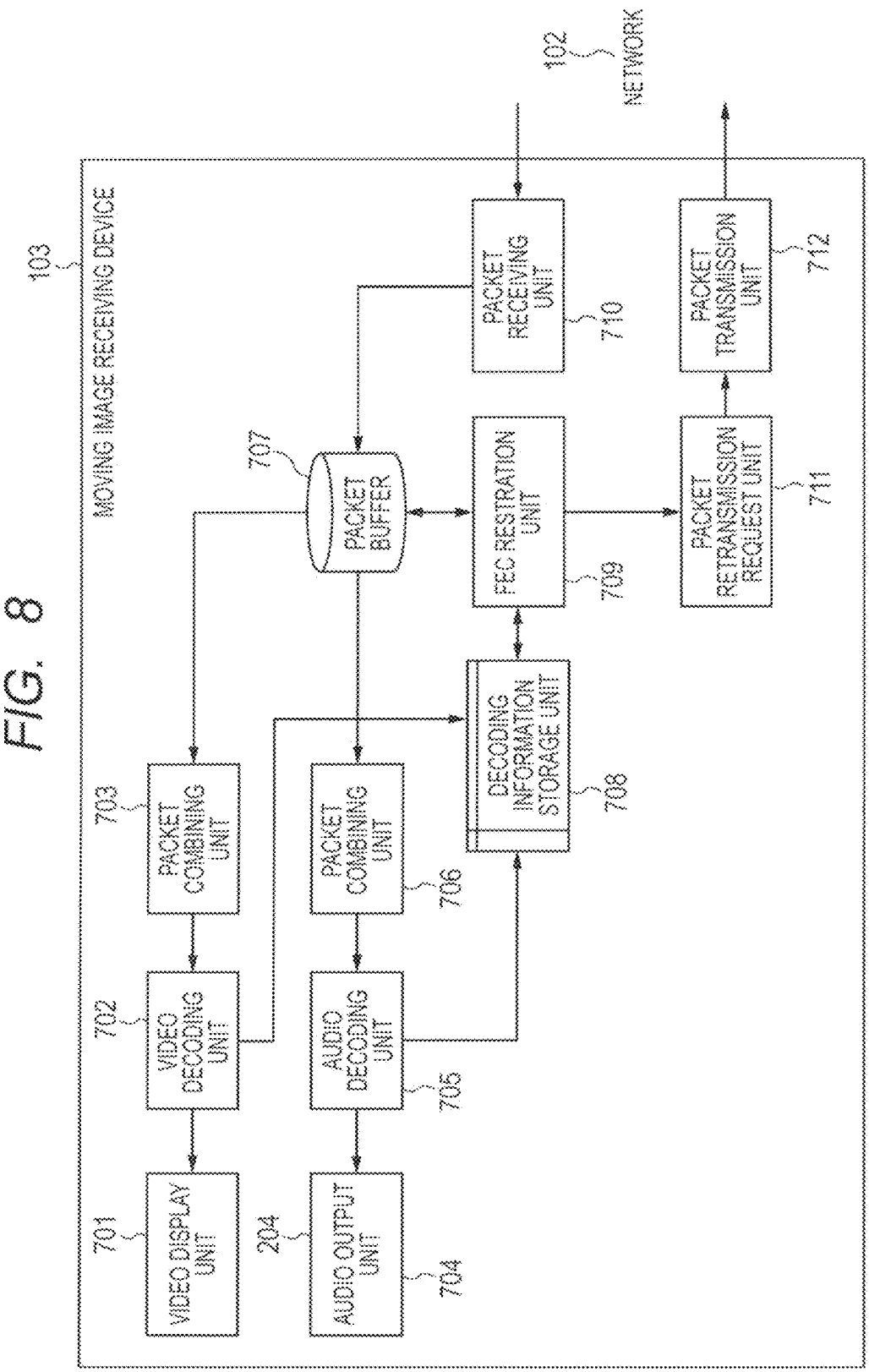
FIG. 8 is a diagram for illustrating a function block configuration of a receiving device according to the embodiments.

Next, the receiving device 103 according to this embodiment configured to receive the stream data of each layer transmitted from the transmission device 101 according to this embodiment is described in more detail. FIG. 8 is a diagram for illustrating a detailed configuration of the receiving device 103 according to this embodiment. A part or all of the functions of each of the blocks in FIG. 8 may be realized by, as an example, hardware. Note that, a packet buffer 707 (hereinafter referred to as "buffer 707") and a decoding information storage unit 708 (hereinafter referred to as "storage unit 708") of FIG. 8 are, for example, configured by an HDD or a large-capacity semiconductor memory. Further, a part or all of the functions of each of the blocks in FIG. 8 may be realized by, as an example, a processor executing programs recorded on a recording medium. The drawings and description relating to a configuration example in the case of realizing the functions of each of the blocks in FIG. 8 by using a processor to execute programs are described later.

In the receiving device 103 illustrated in FIG. 8, a packet receiving unit 710 is configured to receive the media packets and FEC packets transmitted from the transmission device 101 in a chronological order such as is described above. The packet receiving unit 710 is configured to output each piece of reception packet data of those media packets and FEC packets to the buffer 707. The buffer 707 is configured to store the reception packet data of the media packets and FEC packets transmitted from the packet receiving unit 710. The buffer 707 is configured to output video packets to a packet combining unit 703, and audio packets to a packet combining unit 706, from among the stored media packets.

The packet combining unit 703 is configured to generate, for each stream, video encoded data by combining each of the video packets, and output the generated video encoded data to a video decoding unit 702. The video decoding unit 702 is configured to decode the video encoded data of each stream. The video decoding unit 702 is configured to output the decoded video data to a video display unit 701. The video display unit 701 is configured to output the video data to a display device (not shown) and the like. Further, the video decoding unit 702 is configured to store in the storage unit 708 timestamp information on the video encoded data read for the purpose of decoding.

The packet combining unit 706 is configured to generate audio encoded data by combining each of the audio packets of the streams, and output the generated audio encoded data to an audio decoding unit 705. The audio decoding unit 705 is configured to decode the audio encoded data. The audio decoding unit 705 is configured to output the decoded audio data to an audio output unit 704. The audio output unit 704 is configured to output the audio data to a speaker (not shown) and the like. Further, the audio decoding unit 705 is configured to store in the storage unit 708 timestamp information on the audio encoded data read for the purpose of decoding.

An FEC restoration unit 709 is configured to monitor the buffer 707. When the FEC restoration unit 709 detects a lost data packet (loss of a media packet), the FEC restoration unit 709 attempts to restore that lost data packet (lost media packet) by using the FEC packets. The FEC restoration unit 709 is configured to identify which stream and which FEC group the lost media packet belongs to based on the above-mentioned stream identification information, packet identification information, and group identification information. The details of the restoration processing performed by the FEC restoration unit 709 are described later. The FEC restoration unit 709 is configured to store, when restoration of the media packet is successful, the restored media packet in the buffer 707.

In addition to monitoring the buffer 707, the FEC restoration unit 709 is also configured to refer to the storage unit 708 and detect lost media packets for which decoding of the encoded data may not be in time. The FEC restoration unit 709 is configured to issue, when a lost media packet for which decoding may not be in time is detected, a request to a packet retransmission request unit 711 to retransmit the relevant media packet.

The packet retransmission request unit 711 is configured to generate, when the packet retransmission request unit 711 receives a retransmission request from the FEC restoration unit 709, an RTCP negative acknowledgement RTCP packet relating to the media packet designated by the retransmission request, and transmit the RTCP negative acknowledgement RTCP packet to the transmission device 101, which is the transmission source, via a transmission unit 712.

Next, a flow of the decoding processing performed by the FEC restoration unit 709 in the receiving device 103 according to this embodiment is described with reference to the flowchart of FIG. 9.

In FIG. 9, in Step S801, the FEC restoration unit 709 monitors the buffer 707. Further, in Step S802, the FEC restoration unit 709 determines whether or not a media packet has been lost based on the RTP sequence numbers and the arrival times of the media packets stored in the buffer 707. When it is determined that a media packet has been lost, the FEC restoration unit 709 advances the processing to Step S803. On the other hand, when it is determined that a media packet has not been lost, the FEC restoration unit 709 advances the processing to Step S804.

In Step S803, the FEC restoration unit 709 attempts FEC restoration processing of the lost media packet. Note that, the details of the FEC restoration processing performed in Step S803 are described later. After Step S803, the FEC restoration unit 709 advances the processing to Step S804.

In Step S804, the FEC restoration unit 709 acquires a decoding time limit of the encoded data based on the timestamp stored in the storage unit 708. After Step S804, the FEC restoration unit 709 advances the processing to Step S805.

In Step S805, based on the decoding time limit information, the FEC restoration unit 709 determines whether or not there is a lost media packet that is predicted to not be in time for the nearest decoding time limit. When it is determined that there is a lost media packet that is predicted to not be in time for the nearest decoding time limit, the FEC restoration unit 709 advances the processing to Step S806. On the other hand, when it is determined that there are no lost media packets that are predicted to not be in time for the nearest decoding time limit, the FEC restoration unit 709 advances the processing to Step S807.

In Step S806, the FEC restoration unit 709 issues a request to the packet retransmission request unit 711 to retransmit the relevant media packet. After Step S806, the FEC restoration unit 709 returns the processing to Step S801.

In Step S807, the FEC restoration unit 709 determines whether or not all of the media packets of all of the streams have been received and whether or not decoding of those media packets is complete. When it is determined that reception and decoding of all of the media packets are not complete, and that there are some unprocessed media packets remaining, the FEC restoration unit 709 returns the processing to Step S801. On the other hand, when it is determined that reception and decoding of all of the media packets are complete, the FEC restoration unit 709 finishes the processing.

Figure 10A:
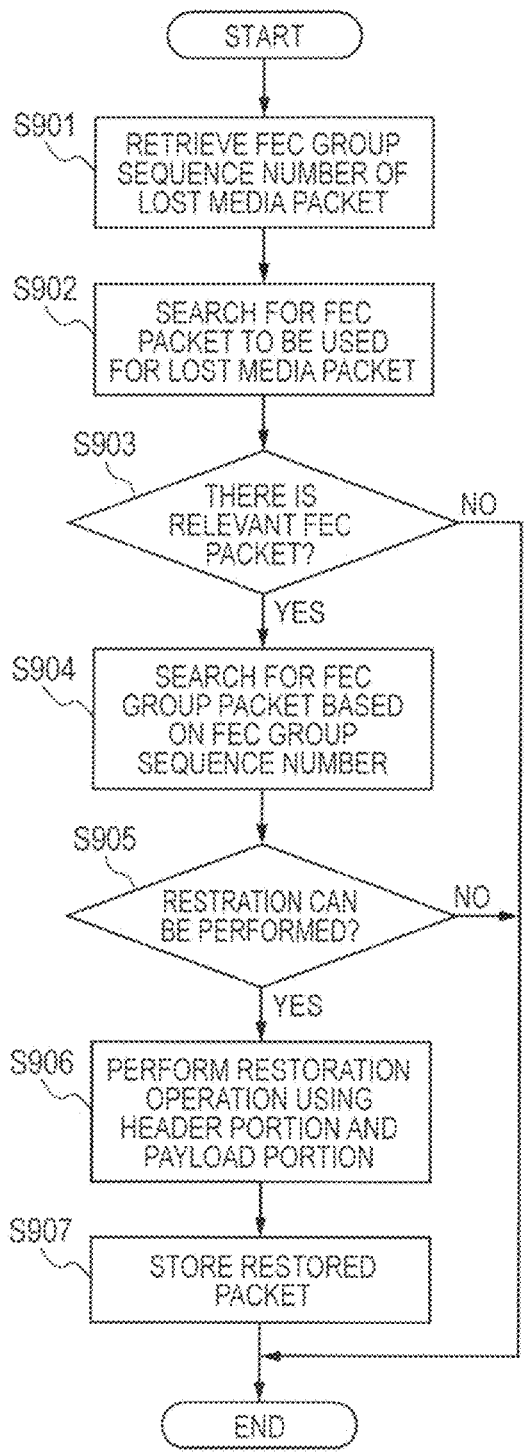
FIG. 10A and FIG. 10B are flowcharts of FEC restoration processing according to the first embodiment and the second embodiment.

Next, FIG. 10A is a flowchart for illustrating a detailed processing flow of the FEC restoration processing performed in Step S803 of FIG. 9. Detailed FEC restoration processing performed by the FEC restoration unit 709 according to this embodiment is now described with reference to the flowchart of FIG. 10A.

In FIG. 10A, first, in Step S901, the FEC restoration unit 709 according to this embodiment acquires the RTP sequence number and the arrival time of a lost media packet, and the FEC group sequence numbers of the media packets that arrived before and after the lost media packet. Note that, when the RTP sequence number and the arrival time of the lost media packet cannot be acquired, the FEC restoration unit 709 predicts the RTP sequence number and the arrival time of the lost media packet based on the FEC group sequence numbers of the media packets that arrived before and after the lost media packet. Further, the FEC restoration unit 709 determines the FEC group sequence number of the lost media packet based on the RTP sequence number and the arrival time of the lost media packet, and the FEC group sequence numbers of the media packets that arrived before and after the lost media packet. After Step S901, the FEC restoration unit 709 advances the processing to Step S902.

In Step S902, the FEC restoration unit 709 searches for the FEC packet to be used in restoration based on the FEC group sequence number of the lost media packet. After Step S902, the FEC restoration unit 709 advances the processing to Step S903.

In Step S903, the FEC restoration unit 709 determines whether or not the FEC packet searched for in Step S902 exists. When it is determined that the relevant FEC packet does not exist, the FEC restoration unit 709 finishes the FEC restoration processing, and advances the processing to Step S804 of FIG. 9. On the other hand, when it is determined that the relevant FEC packet does exist, the FEC restoration unit 709 advances the processing to Step S904.

In Step S904, the FEC restoration unit 709 searches the buffer 707 for the media packet to be included in the FEC group by the relevant FEC packet based on the FEC group sequence number. After Step S904, the FEC restoration unit 709 advances the processing to Step S905.

In Step S905, the FEC restoration unit 709 determines whether or not each of the media packets required for restoration of the lost media packet is present. When it is determined that not all of the media packets required for restoration of the lost media packet are present, and hence restoration cannot be performed, the FEC restoration unit 709 finishes the FEC restoration processing, and advances the processing to Step S804 of FIG. 9. On the other hand, when it is determined that each of the media packets required for restoration of the lost media packet is present, and hence restoration can be performed, the FEC restoration unit 709 advances the processing to Step S906.

In Step S906, the FEC restoration unit 709 performs a restoration operation (XOR operation) for the lost media packet by using the FEC packets and the media packets of the FEC group. After Step S906, the FEC restoration unit 709 advances the processing to Step S907.

In Step S907, the FEC restoration unit 709 stores the restored media packet in the buffer 707, finishes the FEC restoration processing, and then advances the processing to Step S804 of FIG. 9.

Based on the above-mentioned processing, the receiving device 103 according to this embodiment can restore a lost media packet by using the media packets and the FEC packets included in an FEC group that is formed across a plurality of streams.

Note that, in this embodiment, the FEC restoration unit 709 of the receiving device 103 is configured to perform the media packet loss determination based on the RTP sequence number, and then retrieve the corresponding FEC group sequence number. As another example, the FEC restoration unit 709 may perform the media packet loss determination by referring to the FEC group sequence number.

Thus, as described above, with the transmission device 101 and the receiving device 103 according to the first embodiment, delays in error recovery may be prevented.

Second Embodiment

Next, a second embodiment of the present invention is described. In the second embodiment, a part of the processing is different from that in the first embodiment. Note that, the configuration of the transmission device 101 and the configuration of the receiving device 103 according to the second embodiment are the same as in the above-mentioned first embodiment. In the case of the second embodiment, the FEC information, the FEC operation processing performed in Step S308 of FIG. 4, and the FEC restoration processing performed in Step S803 of FIG. 9 are different from the first embodiment. In this case, only the parts that are different from the first embodiment are described. The FEC operation processing performed in Step S308 of FIG. 4 according to the second embodiment is now described in more detail with reference to FIG. 6B, FIG. 7B, FIG. 11A, and FIG. 11B.

Figure 11A:
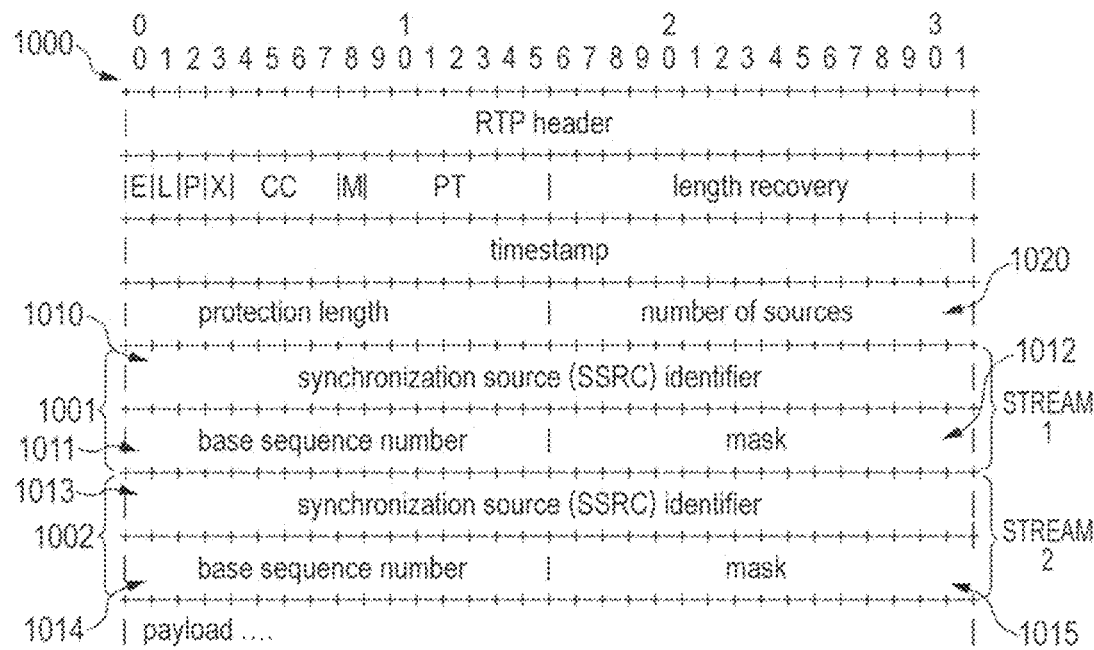
FIG. 11A and FIG. 11B are diagrams for illustrating a configuration of an extension area of an FEC header according to the second embodiment.

FIG. 11A is a diagram for illustrating a format of a header 1000 of an FEC packet according to the second embodiment. The header 1000 of the FEC packet according to this embodiment illustrated in FIG. 11A is partially different from the FEC packet format defined in RFC 5109. In the header 1000 of the FEC packet in the case of the second embodiment, a part of the header extension area is used as stream extension fields 1001 and 1002.

The stream extension field 1001 is configured by an SSRC field 1010, a base sequence number field 1011, and a mask field 1012. Similarly, the stream extension field 1002 is configured by an SSRC field 1013, a base sequence number field 1014, and a mask field 1015. The stream extension field 1001 is an extension field for the stream 1, and the stream extension field 1002 is an extension field for the stream 2. Note that, the example illustrated in FIG. 11A only shows two streams, namely, the streams 1 and 2. However, this is one example, and the number of streams may be three or more. The stream 1 is, for example, the stream of the base layer, and the stream 2 is, for example, associated with the stream of the corresponding layer, such as the first enhancement layer. The number of streams written in the stream extension field is written in a number of sources field 1020. In other words, the SSRC field, the base sequence number field, and the mask field are written in the header extension area of the FEC packet so as to match the number of streams that the media packets to be included in the FEC group belong to. Note that, the base sequence number field is a sequence number (SN) base field defined in RFC 5109, and the mask field is also a field defined in RFC 5109.

The SSRC field of the header portion of the FEC packet is a field in which stream identification information (identifier) for identifying the stream that the media packets to be included in the FEC group belong to. In the stream specified by the SSRC, the base sequence number field is a field in which the sequence number indicating the first media packet among the media packets to be included in the FEC group is written. In the stream specified by the SSRC, the mask field is a field in which information indicating which of the media packets following the first media packet written in the base sequence number field in the stream specified by the SSRC are to be included in the FEC group. Each 16-bit value written in the mask field corresponds to the order in which the media packets to be included in the FEC group are arranged. In other words, the media packet corresponding to the order indicated by the "1" bit among the 16 bits of the mask field is associated with generation of the FEC packet (is to be included in the FEC group). Based on the values of the base sequence number field and the mask field, the media packets to be included in the FEC group in the stream identified by the SSRC field are specified. In other words, the values of the base sequence number field and the mask field serve as packet identification information for specifying which media packets the media packets to be included in the FEC group are in the stream specified by the SSRC.

FIG. 6B is a diagram for showing an example of the written content in the FEC generation information table according to the second embodiment. In the FEC generation information table in the case of the second embodiment, an FEC packet ID, the base sequence number of each stream, and a value of each selection mask are registered as one entry. The base sequence numbers in FIG. 6B are information in which the base sequence number field of FIG. 11A is written. The selection masks in FIG. 6B are information in which the mask field of FIG. 11A is written. Note that, in FIG. 6B, the values for the selection masks of the streams 1 and 2 are represented in binary form, and the values for all the other fields are represented in decimal form.

Figure 11B:
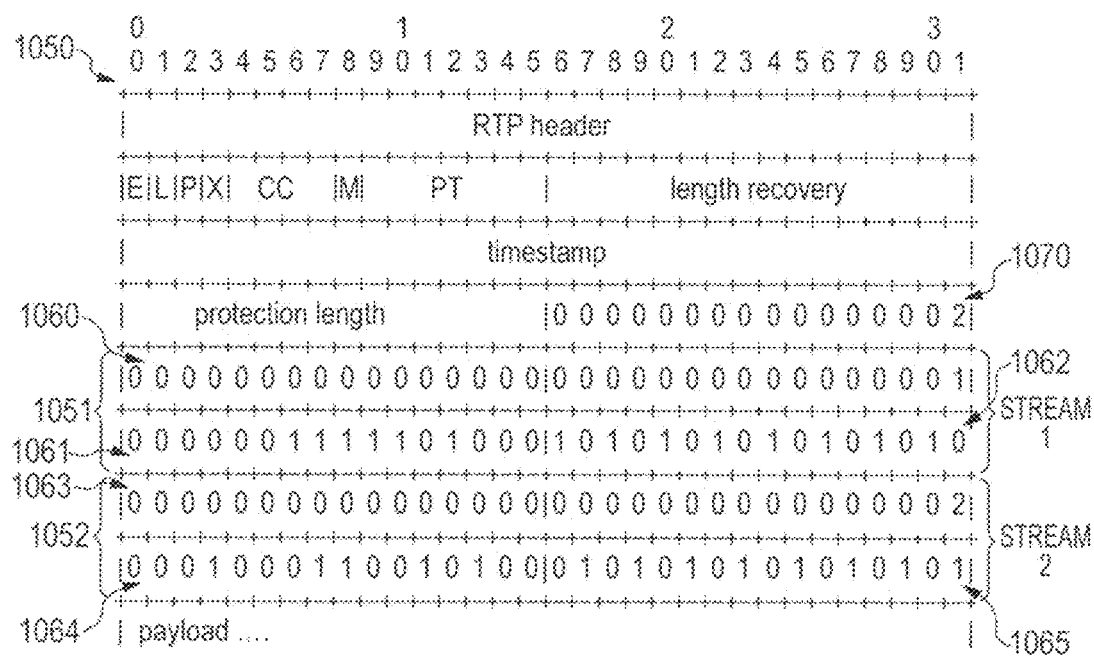

Further, in the case of the entry in FIG. 6B having an FEC packet ID of "1", each of the values such as an those in a stream extension field 1051 of a header portion 1050 illustrated in FIG. 11B are written in the extension field of the header portion of the FEC packets. In other words, in the example shown in FIG. 6B, for the entry having "1" as an FEC packet ID, the base sequence number of stream 1 is "1000". Further, the selection mask of stream 1 is "1010101010101010", the base sequence number of stream 2 is "4500", and the selection mask of stream 2 is "0101010101010101". Therefore, for the entry in FIG. 6B having "1" as an FEC packet ID, "1" is written in an SSRC field 1060 of the stream extension field 1051 of FIG. 11B. In addition, the "0000001111101000" expressing "1000" in binary form is written in a base sequence number field 1061, and "1010101010101010" is written in a mask field 1062. Similarly, for the entry in FIG. 6B having "2" as an FEC packet ID, "2" is written in an SSRC field 1063 of a stream extension field 1052 of FIG. 11B. In addition, the "0001000110010100" expressing "4500" in binary form is written in a base sequence number field 1064, and "0101010101010101" is written in a mask field 1065.

FIG. 7B is a flowchart for illustrating a detailed processing flow of the FEC operation processing performed in Step S308 of FIG. 4 in the second embodiment. The FEC operation processing performed by the FEC packet generation unit 209 according to the second embodiment is now described with reference to the flowchart of FIG. 7B.

In FIG. 7B, first, in Step S606, the FEC packet generation unit 209 according to the second embodiment reads information on the relevant entry from the FEC generation information table of FIG. 6B. After Step S606, the FEC packet generation unit 209 advances the processing to Step S607.

In Step S607, the FEC packet generation unit 209 performs the FEC operation (XOR operation) as described above on the field of the header portion and the data of the payload portion of the FEC packet such as those illustrated in FIG. 11A and FIG. 11B. After Step S607, the FEC packet generation unit 209 advances the processing to Step S608.

In Step S608, the FEC packet generation unit 209 writes each piece of identification information on each stream and the media packet in the SSRC field, the base sequence number field, and the mask field, which are the stream extension fields of the FEC packet.

Based on the processing described above, the transmission device 101 according to the second embodiment transmits to the receiving device 103 each media packet and the FEC packets generated using the media packets of an FEC group that is formed across a plurality of streams.

Figure 10B:
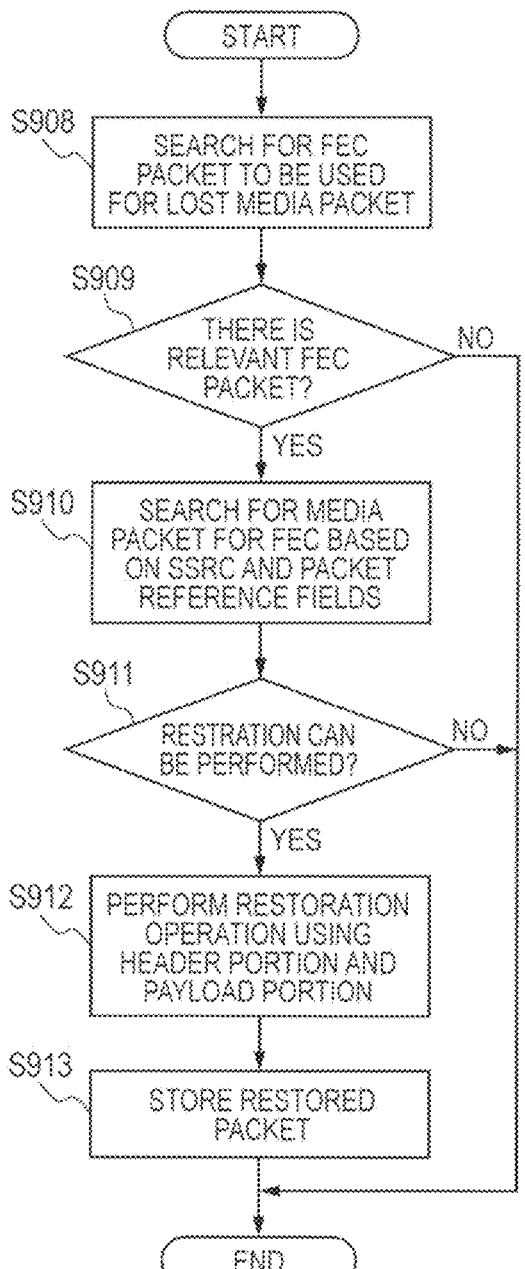

Next, the restoration processing performed by the FEC restoration unit 709 in the receiving device 103 according to the second embodiment is described roughly by following the flow of the flowchart illustrated in FIG. 9. However, in the case of the second embodiment, the processing performed in Step S803 is different to that in the first embodiment. A detailed flow of the FEC restoration processing performed in Step S803 by the FEC restoration unit 709 according to the second embodiment is described with reference to the flowchart of FIG. 10B.

First, in Step S908, the FEC restoration unit 709 refers to the RTP sequence number of the lost media packet and the SSRC field, the base sequence field, and the mask field of the header portion of each FEC packet. Further, the FEC restoration unit 709 searches the buffer 707 for FEC packet capable of restoring the lost media packet by using as a search key the values referred to. After Step S908, the FEC restoration unit 709 advances the processing to Step S909.

In Step S909, the FEC restoration unit 709 determines whether or not the relevant FEC packet has been retrieved by the search processing of Step S908. When it is determined that the relevant FEC packet does not exist, the FEC restoration unit 709 finishes the restoration processing, and advances the processing to Step S804 of FIG. 9. On the other hand, when it is determined that the relevant FEC packet does exist, the FEC restoration unit 709 advances the processing to Step S910.

In Step S910, the FEC restoration unit 709 refers to the value in the SSRC field, the value in the base sequence field, and the value in the mask field of the header portion of the relevant FEC packet, and search the buffer 707 for the media packet required for restoration. After Step S910, the FEC restoration unit 709 advances the processing to Step S911.

In Step S911, the FEC restoration unit 709 determines whether or not all of the media packets capable of restoring the lost media packet are present. When it is determined that not all of the media packets capable of restoring the lost media packet are present, and hence restoration cannot be performed, the FEC restoration unit 709 finishes the FEC restoration processing, and advances the processing to Step S804 of FIG. 9. On the other hand, when it is determined that all of the media packets capable of restoring the lost media packet are present, and hence restoration can be performed, the FEC restoration unit 709 advances the processing to Step S912.

In Step S912, the FEC restoration unit 709 performs a restoration operation (XOR operation) for the lost media packet by using the header portion and the payload portion of the FEC packets and the media packets retrieved in Step S901. After Step S912, the FEC restoration unit 709 advances the processing to Step S913.

In Step S913, the FEC restoration unit 709 stores the restored media packet in the buffer 707, finishes the FEC restoration processing, and then advances the processing to Step S804 of FIG. 9.

Based on the above-mentioned processing, the receiving device 103 according to the second embodiment restores a lost media packet by using the FEC packets included in an FEC group that is formed across a plurality of streams.

As described above, with the second transmission device 101 and the receiving device 103 according to the second embodiment, delays in error recovery may be prevented.

Figure 12:
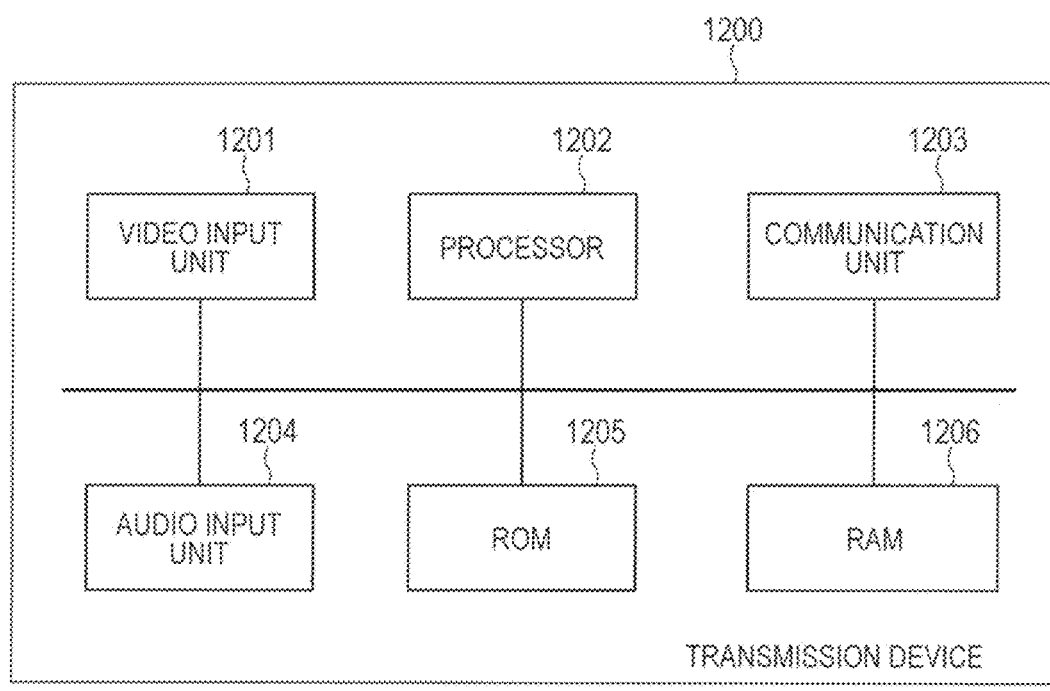
FIG. 12 is a diagram for illustrating a hardware configuration of the transmission device according to the embodiments.

Next, in FIG. 12, an example is illustrated of a transmission device 1200 configured to realize the function of each block illustrated in FIG. 3 by a processor executing programs recorded on a recording medium.

In the transmission device 1200 illustrated in FIG. 12, video data is input to a video input unit 1201, which corresponds to the above-mentioned video input unit 201 in FIG. 3. Audio data is input to an audio input unit 1204, which corresponds to the above-mentioned audio input unit 204 in FIG. 3.

A processor 1202 is configured to read and execute programs recorded in a read-only memory (ROM) 1205. The processor 1202 may be, for example, a central processing unit (CPU), a graphical processing unit (GPU), or the like. A random-access memory (RAM) 1206 is configured to run programs read by the processor 1202 from the ROM 1205. Further, the RAM 1206 is used as a work space for the processor 1202. In addition, the RAM 1206 is also configured to function as the buffer 207 illustrated in FIG. 3. The ROM 1205 is a recording medium in which programs for executing the function of each block illustrated in FIG. 3 by the processor 1202 are recorded.

The processor 1202 is configured to realize the function of each block illustrated in FIG. 3 by executing a program read from the ROM 1205 and running on the RAM 1206. In other words, the processor 1202 is configured to perform, for example, video or audio encoding processing, media packet generation processing, FEC packet generation processing, media packet retransmission control processing, RTCP analysis processing, packet buffer control processing, and the like. Note that, a plurality of processors 1202 may be arranged, and the function of each block illustrated in FIG. 3 may be executed by sharing the load among each of those processors.

A communication unit 1203 is a communication interface for transmitting and receiving packets. The communication unit 1203 is a unit configured to realize the functions of the packet transmission unit 210 and the packet receiving unit 213 illustrated in FIG. 3.

Further, the receiving device configured to realize the function of each block illustrated in FIG. 8 by executing with the processor the programs recorded on the recording medium has roughly the same basic configuration as the configuration illustrated in FIG. 12. However, in the case of the receiving device, a video display unit is arranged instead of the video input unit 1201 of FIG. 12, and an audio output unit is arranged instead of the audio input unit 1204 of FIG. 12. The receiving device is now described with reference to FIG. 12.

In the case of the receiving device, the video display unit is a unit for displaying video data on a display device and the like, and corresponds to the above-mentioned video display unit 701 of FIG. 8. The audio output unit is a unit for outputting audio data to a speaker and the like, and corresponds to the above-mentioned audio output unit 704 of FIG. 8.

Further, the RAM 1206 in the case of the receiving device is configured to function as the buffer 707 of FIG. 8. The ROM 1205 in the case of the receiving device is a recording medium in which programs for executing the function of each block illustrated in FIG. 8 by the processor 1202 are recorded.

The processor 1202 in the case of the receiving device is configured to realize the function of each block illustrated in FIG. 8 by executing a program read from the ROM 1205 and running on the RAM 1206. In other words, the processor 1202 in the case of the receiving device is configured to perform, for example, video or audio decoding processing, media packet combining processing, FEC restoration processing, media packet retransmission request control processing, packet buffer control processing, and the like. Note that, in the case of the receiving device as well, the plurality of processors 1202 may be arranged, and the function of each block illustrated in FIG. 8 may be executed by sharing the load among each of those processors.

The communication unit 1203 in the case of the receiving device is a communication interface for transmitting and receiving packets. In other words, the communication unit 1203 is a unit configured to realize the functions of the packet receiving unit 710 and the packet transmission unit 712 illustrated in FIG. 8.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, in the embodiments described above, SVC is described as an example. However, the embodiments may also be applied for stream data in a format such as H.265 (ISO/IEC 23008-2 HEVC), for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-058539, filed Mar. 20, 2015, which is hereby incorporated by reference herein in its entirety.

What is claimed is:

1. A transmission device, comprising:
one or more processors;
a memory having stored thereon instructions which, when executed by the one or more processors, cause the transmission device to:
generate restoration data packets for restoration of lost data packets by using first data packets, which are data packets forming transmission data and which are transmitted as data packets of a first data stream, and second data packets, which are data packets forming the transmission data and which are transmitted as data packets of a second data stream different from the first data stream; and
a transmitter configured to transmit to a receiving device the first data packets as data packets of the first data stream, transmit to the receiving device the second data packets as data packets of the second data stream, and transmit to the receiving device the restoration data packets generated using the first data packets and the second data packet,
wherein the transmission data includes data of a base layer to be used for displaying by the receiving device an image having a first resolution, and data of an enhancement layer to be used together with the data of the base layer for displaying by the receiving device an image having a second resolution that is higher than the first resolution, and wherein the transmitter is configured to transmit to the receiving device the data of the base layer as the data packets of the first data stream, and transmit to the receiving device the data of the enhancement layer as the data packets of the second data stream.

2. The transmission device according to claim 1, wherein in generating the restoration data packets, the instructions, when executed by the one or more processors, cause the transmission device to form groups including the first data packets and the second data packets, and generate the restoration data packets based on a plurality of data packets included in the groups.

3. The transmission device according to claim 2, wherein in generating the restoration data packets, the instructions, when executed by the one or more processors, cause the transmission device to form the groups including a predetermined number of data packets to be transmitted within a part of a transmission period of the transmission data, and generate the restoration data packets based on the predetermined number of data packets included in the groups.

4. The transmission device according to claim 2, wherein in generating the restoration data packets, the instructions, when executed by the one or more processors, cause the transmission device to include identification information for identifying the group that a data packet belongs to in the data packet.

5. The transmission device according to claim 2, wherein in generating the restoration data packets, the instructions, when executed by the one or more processors, cause the transmission device to generate identification information for identifying each data packet included in one of the groups, and include the generated identification information in the restoration data packets.

6. The transmission device according to claim 4, wherein in generating the restoration data packets, the instructions, when executed by the one or more processors, cause the transmission device to write the identification information in one of an extension area of a header portion of the data packets and an extension area of a header portion of the restoration data packets.

7. The transmission device according to claim 2,
wherein in generating the restoration data packets, the instructions, when executed by the one or more processors, cause the transmission device to generate the restoration data packets based on a forward error correction operation, and
wherein the transmitter is configured to transmit the restoration data packets generated based on the forward error correction operation at a timing at which the data packets included in the group are transmitted.

8. A receiving device, comprising:
a receiver configured to receive from a transmission device first data packets, which are data packets forming transmission data and which are transmitted as data packets of a first data stream, second data packets, which are data packets forming the transmission data and which are transmitted as data packets of a second data stream different from the first data stream, and restoration data packets generated using the first data packets and the second data packets;
one or more processors; and
a memory having stored thereon instructions which, when executed by the one or more processors, cause the receiving device to:
perform restoration processing of lost data packets in a group by using the restoration data packets and data packets that are not lost in the group, the group including the first data packets to be transmitted by the transmission device as data packets of the first data stream and the second data packets to be transmitted by the transmission device as data packets of the second data stream,
wherein the transmission data includes data of a base layer to be used for displaying by the receiving device an image having a first resolution, and data of an enhancement layer to be used together with the data of the base layer for displaying by the receiving device an image having a second resolution that is higher than the first resolution, and
wherein the transmission device is configured to transmit to the receiving device the data of the base layer as the data packets of the first data stream, and transmit to the receiving device the data of the enhancement layer as the data packets of the second data stream.

9. The receiving device according to claim 8, wherein in performing the restoration processing, the instructions, when executed by the one or more processors, cause the receiving device to specify a data stream that a data packet belongs to, a group that the data packet belongs to, and the data packet based on stream identification information for identifying the data stream that the data packet belongs to, packet identification information for identifying the data packet among the data stream, and group identification information for identifying the group, the stream identification information, the packet identification information, and the group identification information being written in an extension area of a header portion of the data packet.

10. The receiving device according to claim 8, wherein in performing the restoration processing, the instructions, when executed by the one or more processors, further cause the receiving device to specify a data packet that belongs to a group corresponding to a restoration data packet and a data stream that the data packet belongs to based on stream identification information for identifying each data stream that each data packet to be included in the group belongs to, and packet identification information for identifying each data packet to be included in the group among the data stream, the stream identification information and the packet identification information being written in an extension area of a header portion of the restoration data packet.

11. A transmission method to be executed by a transmission device configured to transmit data streams, the transmission method comprising:
generating restoration data packets for restoration of lost data packets by using first data packets, which are data packets forming transmission data and which are transmitted as data packets of a first data stream, and second data packets, which are data packets forming the transmission data and which are transmitted as data packets of a second data stream different from the first data stream; and
transmitting to a receiving device the first data packets as data packets of the first data stream, transmitting to the receiving device the second data packets as data packets of the second data stream, and transmitting to the receiving device the restoration data packets generated using the first data packets and the second data packets,
wherein the transmission data includes data of a base layer to be used for displaying by the receiving device an image having a first resolution, and data of an enhancement layer to be used together with the data of the base layer for displaying by the receiving device an image having a second resolution that is higher than the first resolution, and wherein the transmitting includes transmitting to the receiving device the data of the base layer as the data packets of the first data stream, and transmitting to the receiving device the data of the enhancement layer as the data packets of the second data stream.

12. A receiving method to be executed by a receiving device configured to receive data streams, the receiving method comprising:

receiving from a transmission device first data packets, which are data packets forming transmission data and which are transmitted as data packets of a first data stream, second data packets, which are data packets forming the transmission data and which are transmitted as data packets of a second data stream different from the first data stream, and restoration data packets generated using the first data packets and the second data packets; and performing restoration processing of lost data packets in a group by using the restoration data packets and data packets that are not lost in the group, the group including the first data packets to be transmitted by the transmission device as data packets of the first data stream and the second data packets to be transmitted by the transmission device as data packets of the second data stream, wherein the transmission data includes data of a base layer to be used for displaying by the receiving device an image having a first resolution, and data of an enhancement layer to be used together with the data of the base layer for displaying by the receiving device an image having a second resolution that is higher than the first resolution, and wherein the transmission device is configured to transmit to the receiving device the data of the base layer as the data packets of the first data stream, and transmit to the receiving device the data of the enhancement layer as the data packets of the second data stream.

13. A non-transitory computer-readable storage medium having stored thereon a program for causing a computer to perform a transmission method in a transmission device, the transmission method comprising:

generating restoration data packets for restoration of lost data packets by using first data packets, which are data packets forming transmission data and which are transmitted as data packets of a first data stream, and second data packets, which are data packets forming the transmission data and which are transmitted as data packets of a second data stream different from the first data stream; and transmitting to a receiving device the first data packets as data packets of the first data stream, transmit to the receiving device the second data packets as data packets of the second data stream, and transmit to the receiving device the restoration data packets generated using the first data packets and the second data packets, wherein the transmission data includes data of a base layer to be used for displaying by the receiving device an image having a first resolution, and data of an enhancement layer to be used together with the data of the base layer for displaying by the receiving device an image having a second resolution that is higher than the first resolution, and wherein the transmitting includes transmitting to the receiving device the data of the base layer as the data packets of the first data stream, and transmit to the receiving device the data of the enhancement layer as the data packets of the second data stream.

14. A non-transitory computer-readable storage medium having stored thereon a program for causing a computer to perform a receiving method of a receiving device, the receiving method comprising receiving from a transmission device first data packets, which are data packets forming transmission data and which are transmitted as data packets of a first data stream, second data packets, which are data packets forming the transmission data and which are transmitted as data packets of a second data stream different from the first data stream, and restoration data packets generated using the first data packets and the second data packets; and performing restoration processing of lost data packets in a group by using the restoration data packets and data packets that are not lost in the group, the group including the first data packets to be transmitted by the transmission device as data packets of the first data stream and the second data packets to be transmitted by the transmission device as data packets of the second data stream, wherein the transmission data includes data of a base layer to be used for displaying by the receiving device an image having a first resolution, and data of an enhancement layer to be used together with the data of the base layer for displaying by the receiving device an image having a second resolution that is higher than the first resolution, and wherein the transmission devices is configured to transmit to the receiving device the data of the base layer as the data packets of the first data stream, and transmit to the receiving device the data of the enhancement layer as the data packets of the second data stream.

* * * * *